US009098129B2

(12) United States Patent
Ting

(10) Patent No.: US 9,098,129 B2
(45) Date of Patent: Aug. 4, 2015

(54) METHOD FOR CONTROLLING ELECTRONIC DEVICES AND A HAND-HELD DEVICE USING THE SAME

(75) Inventor: Tung-Sheng Ting, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 447 days.

(21) Appl. No.: 13/468,256

(22) Filed: May 10, 2012

(65) Prior Publication Data

US 2012/0297019 A1    Nov. 22, 2012

(30) Foreign Application Priority Data

May 20, 2011   (TW) ............................... 100117833 A
Mar. 15, 2012   (TW) ............................... 101108920 A

(51) Int. Cl.
*G06F 15/16* (2006.01)
*G06F 3/0346* (2013.01)
*G06F 3/038* (2013.01)

(52) U.S. Cl.
CPC .............. *G06F 3/0346* (2013.01); *G06F 3/038* (2013.01); *G06F 2203/0383* (2013.01)

(58) Field of Classification Search
CPC ..... G06F 3/017; G06F 3/0304; G06F 3/0325; G06F 3/038; G06F 3/048; G06F 1/1626; G06F 3/0346; G06F 17/42; G06F 5/0236; H04N 21/42202; G01S 17/42; G01S 5/0236
USPC ........... 709/217; 340/4.31, 8.1; 345/157–158, 345/173; 356/364; 342/378; 455/566
See application file for complete search history.

(56) References Cited

U.S. PATENT DOCUMENTS

| 6,563,430 | B1 * | 5/2003 | Kemink et al. ................. 340/8.1 |
| 8,228,293 | B2 * | 7/2012 | Dohta et al. ................... 345/158 |
| 8,384,698 | B2 * | 2/2013 | Kong ............................. 345/179 |
| 2003/0103651 | A1 * | 6/2003 | Novak .......................... 382/106 |
| 2005/0270494 | A1 * | 12/2005 | Banning ........................ 353/42 |
| 2006/0152487 | A1 * | 7/2006 | Grunnet-Jepsen et al. ... 345/158 |
| 2007/0013657 | A1 * | 1/2007 | Banning ....................... 345/157 |
| 2007/0101381 | A1 | 5/2007 | Furlong et al. |
| 2007/0252721 | A1 * | 11/2007 | Geurts ..................... 340/825.22 |
| 2009/0231582 | A1 * | 9/2009 | Aebischer et al. ............ 356/364 |

(Continued)

FOREIGN PATENT DOCUMENTS

| CN | 1965289 A | 5/2007 |
| TW | 201112048 A1 | 4/2011 |

*Primary Examiner* — Wing F Chan
*Assistant Examiner* — Raji Krishnan
(74) *Attorney, Agent, or Firm* — Muncy, Geissler, Olds & Lowe, P.C.

(57) ABSTRACT

A hand-held device can communicate with at least one electronic device via a communicating platform. The hand-held device includes a location database, at least one orientation device, a computing module, a comparing module, a control unit, and a transmitting module. The at least one orientation device detects a direction information related to the pointed-to electronic device relative to the hand-held device. The location database stores a location information related to the position of each electronic device relative to the hand-held device. The computing module can calculate a pointed-to location information related to the position of the pointed-to electronic device relative to the hand-held device based on the direction information. The comparing module can distinguish the pointed-to electronic device by comparing the pointed-to location information with the location information in the location database.

20 Claims, 21 Drawing Sheets

(56) References Cited

U.S. PATENT DOCUMENTS

2009/0239586 A1 9/2009 Boeve et al.
2010/0309051 A1* 12/2010 Moshfeghi .................... 342/378
2011/0291971 A1* 12/2011 Masaki et al. ................ 345/173
2014/0009632 A1* 1/2014 Glover .................... 348/211.99

* cited by examiner

METHOD FOR CONTROLLING ELECTRONIC DEVICES AND A HAND-HELD DEVICE USING THE SAME

BACKGROUND OF THE DISCLOSURE

1. Field of the Disclosure

The present disclosure relates to a method for controlling electronic devices and a hand-held device using the same.

2. Description of the Prior Art

Electronic apparatuses connected to the Digital Living Network Alliance (DLNA) are selected and controlled by a built-in system device menu installed within the architecture of the DLNA according to the prior art. However, in the device menu displayed by the DLNA architecture, the names of some of the electronic apparatuses are displayed in English. Despite the given serial numbers of the electronic apparatuses, it is rather difficult for users unfamiliar with the electronic apparatuses to identify the electronic apparatus corresponding to each of the electronic apparatus names displayed in the device menu. On the other hand, a remote control is well known by ordinary persons and is a convenient hand-held device. However, a remote control usually controls electronic devices by an infrared ray, and a remote control is seldom designed to be connected to the Internet or the DLNA and thus cannot control the electronic apparatuses connected to the DLNA.

Accordingly, users would find it convenient to operate a hand-held device whereby the users can control electronic apparatuses operating within the architecture of the DLNA or the Internet in a way similar to how a remote control operates, so as to dispense with the hassle of identifying a displayed name and operate, in an intuitive way, the electronic apparatuses connected to the Internet or the DLNA.

SUMMARY OF THE DISCLOSURE

It is a primary objective of the present disclosure to provide a hand-held device for allowing a user to control an electronic device connected to a communicating platform through the communicating platform.

Another primary objective of the present disclosure is to provide a method for controlling an electronic device, selecting the corresponding electronic device, and dispensing with the need to select the intended electronic device from an electronic device menu.

In order to achieve the above and other objectives, the hand-held device of the present disclosure communicates with at least one electronic device via a communicating platform such that, when the hand-held device points to one of the at least one electronic devices, the hand-held device can control the pointed-to electronic device. The hand-held device comprises: at least one orientation device, a location database, a computing module, a comparing module, a control unit, and a transmitting module, wherein the at least one orientation device detects a direction information related to the pointed-to electronic device relative to the hand-held device; the location database stores a position coordinate of each electronic device relative to at least one reference point and the hand-held device relative to reference points, and a location information related to a position of each electronic device relative to the hand-held device; the computing module is electrically connected to at least one orientation device for calculating a pointed-to location information related to a position of the pointed-to electronic device relative to the hand-held device based on the direction information; the comparing module is electrically connected to the computing module and the location database respectively for comparing the pointed-to location information with the location information stored in the location database to distinguish the pointed-to electronic device; the control unit is electrically connected to the comparing module for sending a control command to control the pointed-to electronic device; and the transmitting module is electrically connected to the control unit for sending the control command to the pointed-to electronic device via the communicating platform.

When the hand-held device of the present disclosure is used, the location database is loaded into the hand-held device of the present disclosure via the communicating platform.

According to an embodiment of the present disclosure, the at least one orientation device includes a G-sensor, a digital compass, and a ranging device.

According to another embodiment of the present disclosure, the at least one reference point is a plurality of reference points.

The present disclosure further provides a method for controlling electronic devices, by allowing a hand-held device to communicate with at least one electronic device via a communicating platform such that, when the hand-held device points to one of the at least one electronic devices, the hand-held device can control the pointed-to electronic device. The method comprises the steps of: creating a coordinate system in a space accommodating the electronic devices; storing a position coordinate of the electronic devices and the hand-held device within the coordinate system, and a location information related to a position of the electronic devices relative to the hand-held device in a location database; loading the location database into the hand-held device; requesting whether calibration of the location information is necessary; calculating pointed-to location information related to a position of the pointed-to electronic device relative to the hand-held device based on the direction information; comparing the pointed-to location information with the location information in the location database to distinguish the pointed-to electronic device; starting a control unit for sending a control command; and sending the control command to the pointed-to electronic device via the communicating platform to control the pointed-to electronic device.

BRIEF DESCRIPTION OF THE DRAWINGS

The above and other objectives, features, and advantages of the present disclosure are hereunder illustrated with specific embodiments in conjunction with the accompanying drawings and therefore rendered distinctive and comprehensible, in which.

DETAILED DESCRIPTION OF THE EMBODIMENTS OF THE DISCLOSURE

The objects, features, and advantages of the present disclosure will be readily understood from the following embodiments and accompanying drawings.

Figure 1:
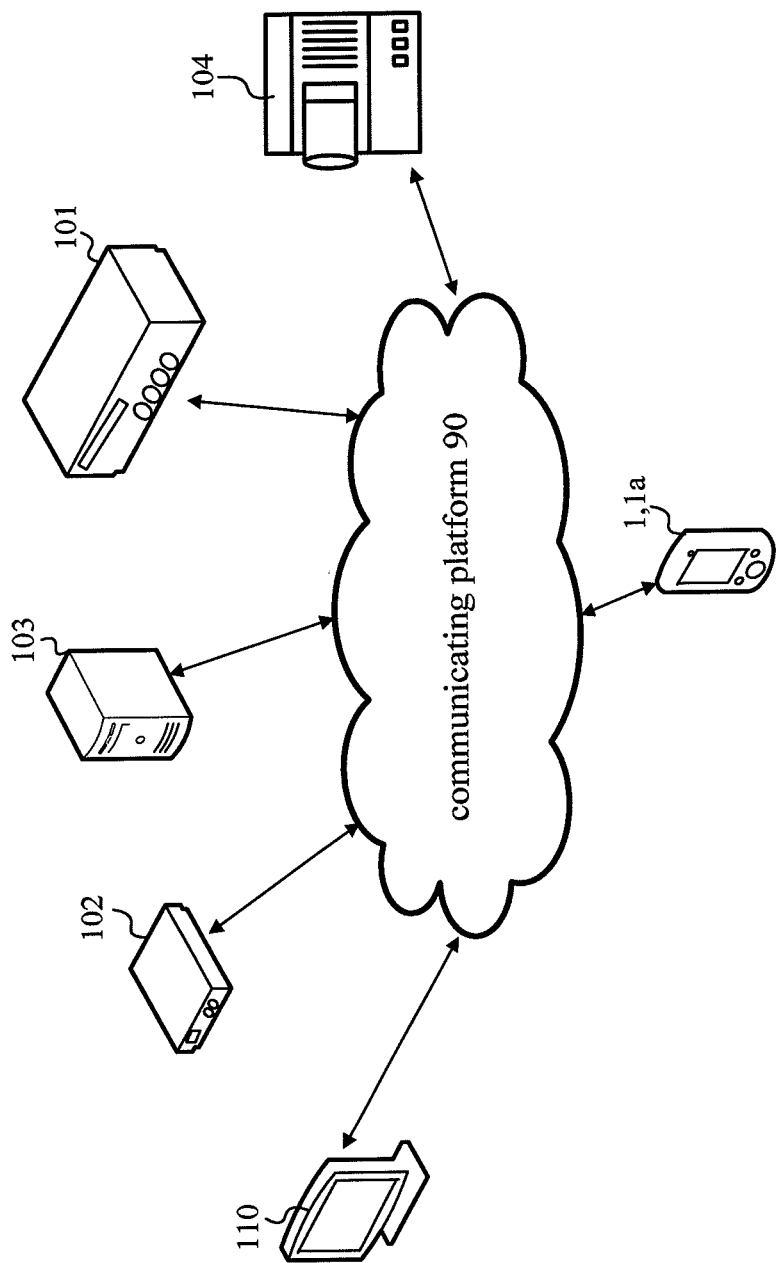
FIG. 1 is a schematic view of a communication environment of the first embodiment and the second embodiment of a hand-held device with electronic devices of the present disclosure.
Figure 2:
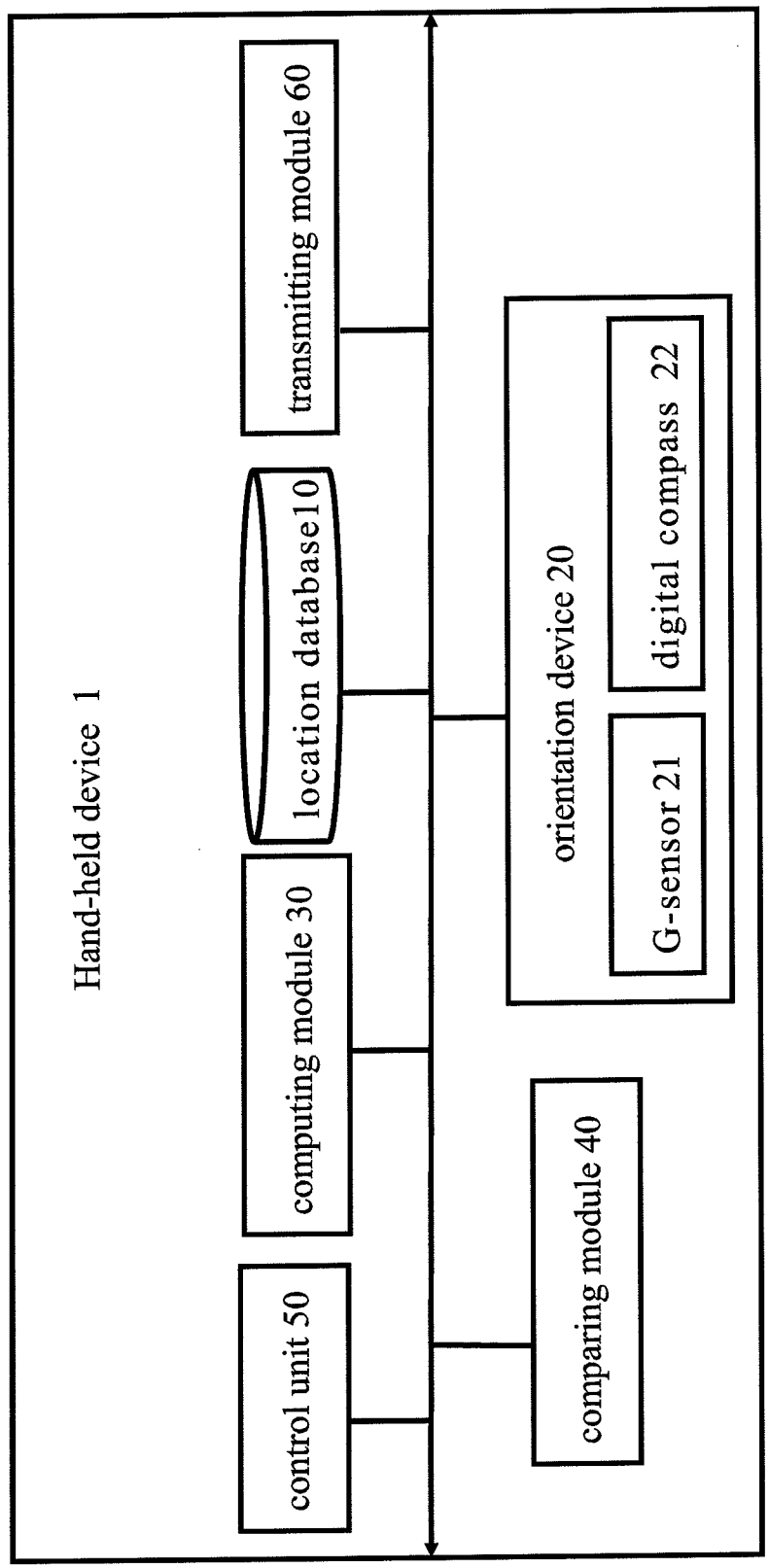
FIG. 2 is a hardware structure diagram of the first embodiment of the hand-held device according to the present disclosure.

Referring to FIG. 1 and FIG. 2 of the accompanying drawings, FIG. 1 is a schematic view of a communication environment of the first embodiment and the second embodiment of a hand-held device and electronic devices of the present disclosure, and FIG. 2 is a hardware structure diagram of the first embodiment of the hand-held device 1 according to the present disclosure. As shown in FIG. 1, the hand-held device 1 of the present disclosure communicates with at least one of the electronic devices 101, 102, 103, 104, 110 via a communicating platform 90 such that, when the hand-held device 1 points to one of the electronic devices 101, 102, 103, 104, 110, the hand-held device 1 can control the pointed-to electronic device. In this embodiment, the hand-held device 1 is a personal digital assistant (PDA), but the present disclosure is not limited thereto, for the hand-held device 1 can also be a desktop computer, a notebook computer, a tablet computer, a cell phone, or any other electronic device capable of communicating with the communicating platform 90. The electronic devices 101, 102, 103, 104, 110 are an audio amplifier, an audiovisual file storing device, a video recorder, a projector, and a TV set, which are commonly found in a living room. The electronic devices 101, 102, 103, 104, 110 can also be other electronic devices that support the Digital Living Network Alliance (DLNA) and can be controlled by the communicating platform 90. In this embodiment, the pointed-to electronic device 110 is a TV set. The communicating platform 90 is a communicating platform certified by the DLNA, but the present disclosure is not limited thereto, for the communicating platform 90 can also be the Internet.

As shown in FIG. 2, the hand-held device 1 of the first embodiment of the present disclosure comprises a location database 10, at least one orientation device 20, a computing module 30, a comparing module 40, a control unit 50, and a transmitting module 60. The location database 10 stores position coordinates of the electronic devices 101, 102, 103, 104, 110 and the hand-held device 1, and stores location information related to the position of the electronic devices 101, 102, 103, 104, 110 relative to the hand-held device 1. At least one orientation device 20 detects a direction information related to the pointed-to electronic device 110 relative to the hand-held device 1. The direction information comprises information related to a vertical direction, a horizontal direction, and an inclination angle direction of the pointed-to electronic device 110 relative to the hand-held device 1. The computing module 30 is electrically connected to at least one orientation device 20 for calculating a pointed-to location information related to the position of the pointed-to electronic device 110 relative to the hand-held device 1 based on the direction information detected by at least one orientation device 20. The comparing module 40 is electrically connected to the computing module 30 and the location database 10 respectively for comparing the pointed-to location information calculated by the computing module 30 and the location information stored in the location database 10 to distinguish the pointed-to electronic device 110. The control unit 50 is electrically connected to the comparing module 40 for sending a control command to enable the pointed-to electronic device 110 to execute a related function, for example, starting or shutting down the pointed-to electronic device 110, to achieve the purpose of controlling the pointed-to electronic device 110. The transmitting module 60 is electrically connected to the control unit 50 for sending the control command to the pointed-to electronic device 110 via the communicating platform 90. A point to note is that the aforesaid modules and devices can be a hardware device, a software program, firmware, a circuit loop, or a combination thereof. In an embodiment of the present disclosure, at least one orientation device 20 comprises a G-sensor 21 and a digital compass 22, but the present disclosure is not limited thereto, for at least one orientation device 20 can also be any device capable of detecting a direction information.

According to one embodiment of the present disclosure, the location database 10 is stored in the storing unit (not shown in a figure), but the present disclosure is not limited thereto. A point to note is that the location database 10 can be stored in an online cloud server. When the hand-held device of the present disclosure is used by a user for controlling the electronic devices, the user can load the location database 10 into the hand-held device 1 via the communication platform 90.

Figure 3:
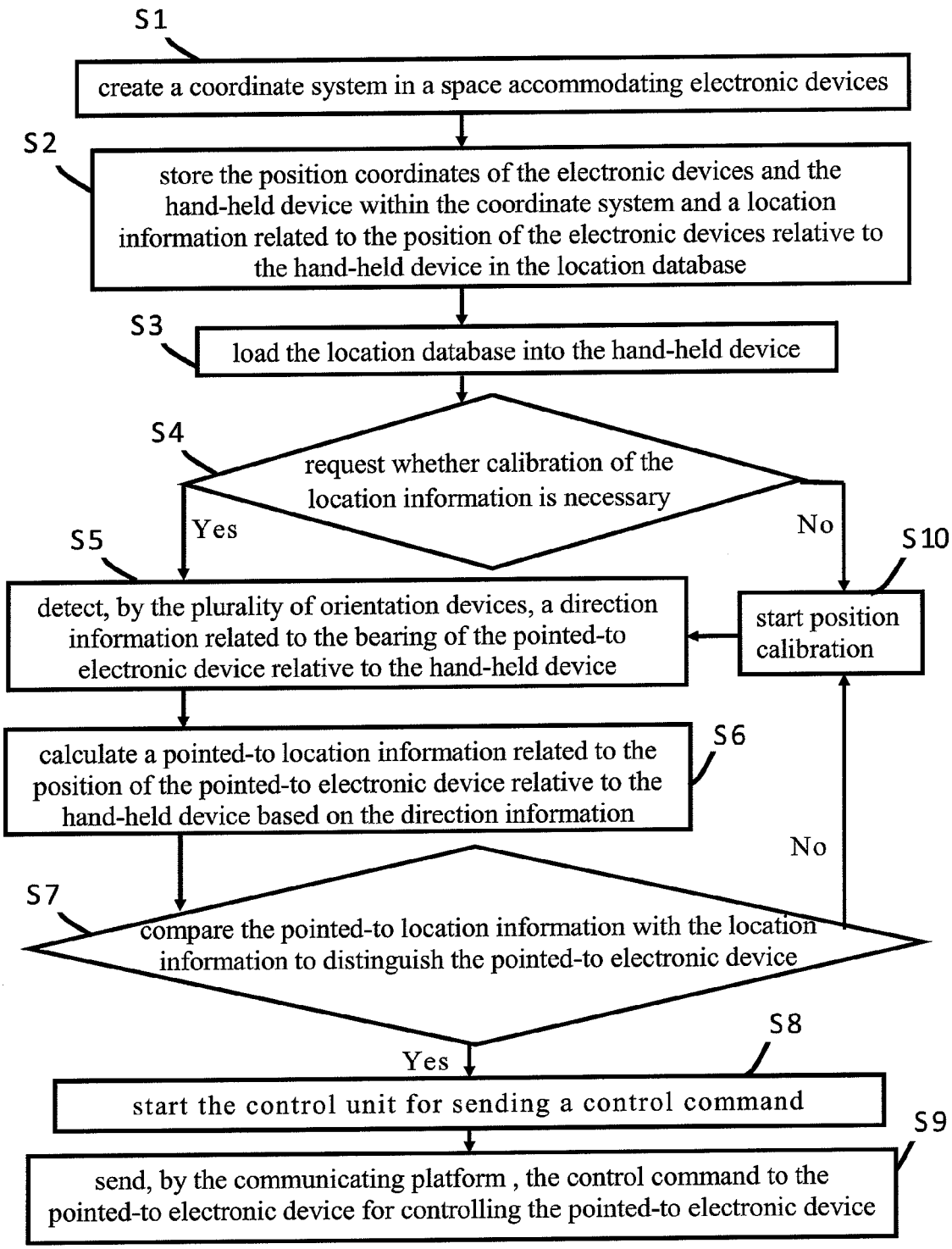
FIG. 3 is a flowchart of a method for controlling electronic devices according to the present disclosure.
Figure 4:
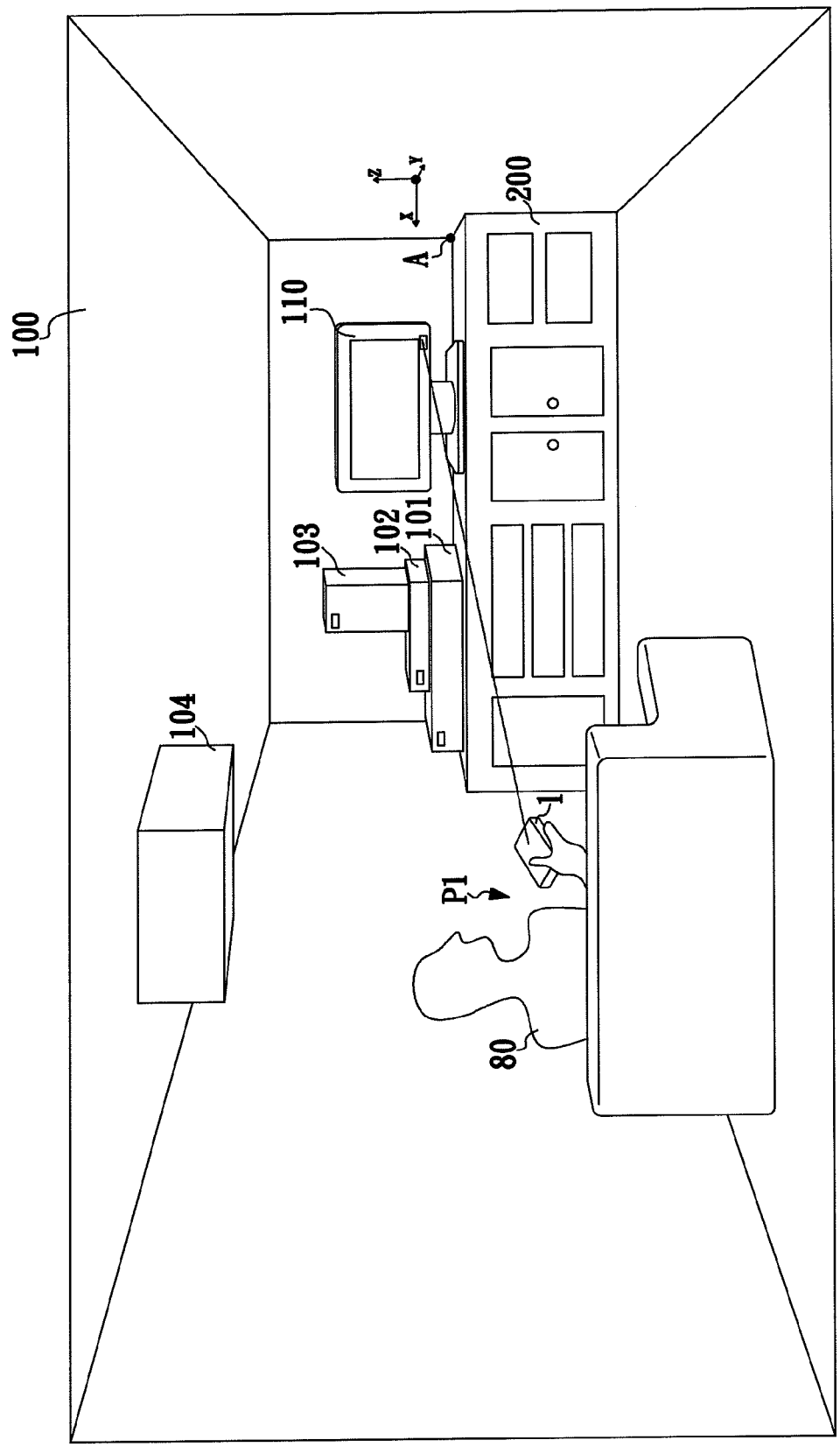
FIG. 4 is a schematic view of an environment where the first embodiment of the hand-held device operates according to the present disclosure.
Figure 4A:
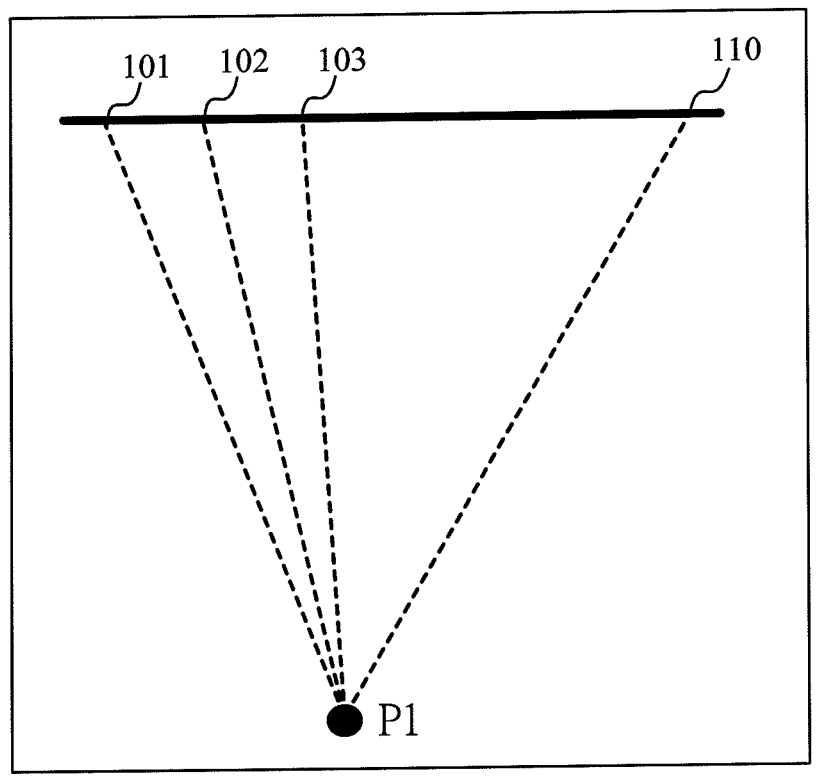
FIG. 4A is a schematic view of detecting by the first embodiment of the hand-held device a horizontal location information of the electronic devices according to the present disclosure.
Figure 4B:
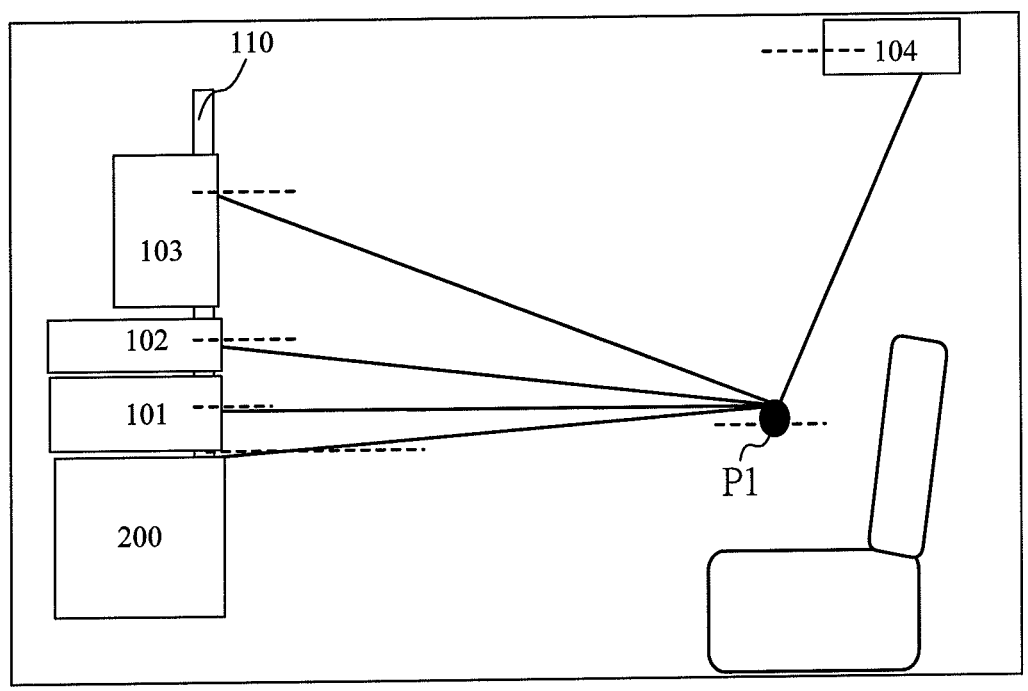
FIG. 4B is a schematic view of detecting by the first embodiment of the hand-held device a vertical location information of the electronic devices according to the present disclosure.

Please refer to FIG. 3 and FIG. 4 of the accompanying drawings. FIG. 3 is a flowchart of a method for controlling electronic devices according to the present disclosure. FIG. 4 is a schematic view of an environment where the first embodiment of the hand-held device 1 operates according to the present disclosure. FIG. 4A is a schematic view of detecting, by the first embodiment of the hand-held device, a horizontal location information of the electronic devices according to the present disclosure. FIG. 4B is a schematic view of detecting, by the first embodiment of the hand-held device, a vertical location information of the electronic devices according to the present disclosure.

As shown in FIG. 3, a method for controlling electronic devices according to the present disclosure enables the hand-held device 1 to communicate with at least one of the electronic devices 101, 102, 103, 104, 110 via the communicating platform 90 such that, when the hand-held device 1 points to at least one of the electronic devices 101, 102, 103, 104, 110, such as the electronic device 110, the hand-held device 1 can control the pointed-to electronic device 110. The method for controlling electronic devices according to the present disclosure comprises the steps as follows:

Step S1: create a coordinate system in a space 100 accommodating the electronic devices 101, 102, 103, 104, 110.

Taking FIG. 4 as an example, in the space 100, a three-dimensional coordinate system (comprising the x-coordinate, the y-coordinate, and the z-coordinate) is created by seeing a reference point A as the coordinate origin, such that each of the electronic devices 101, 102, 103, 104, 110 within the coordinate system can be located by a position coordinate. In an embodiment of the present disclosure, the space 100 is a living room. A point to note is that creating the coordinates of this embodiment needs a user or a technical operator to measure the actual distance between each of the electronic devices 101, 102, 103, 104, 110 and the coordinate origin A respectively for determining the position coordinates of the electronic devices 101, 102, 103, 104, 110 within the coordinate system. For example, the position coordinate (20, 20, 60) of the electronic device will mean that, by an actual measurement, the distance between the electronic device 110 and the coordinate origin A on the X-axis is 20 cm, the distance on the Y-axis is 20 cm, and the distance on the Z-axis is 60 cm.

Step S2: store the position coordinates of the electronic devices 101, 102, 103, 104, 110 and the hand-held device 1 within the coordinate system and a location information related to the position of the electronic devices 101, 102, 103, 104, 110 relative to the hand-held device 1 in the location database 10.

Upon completion of the creation of the coordinate system, the position coordinates of the electronic devices 101, 102, 103, 104, 110 within the coordinate system and the position coordinate of a position P1 of the hand-held device 1 within the coordinate system are stored in the location database 10. In general, once electronic devices are placed in a space like a living room, their positions in the space will remain unchanged; hence, the position coordinates of the electronic devices 101, 102, 103, 104, 110 in the space 100 are deemed constant. A point to note is that, when measuring the distance between each of the electronic devices 101, 102, 103, 104, 110 and the coordinate origin A in FIG. 4, the relative distance between the position P1 of the hand-held device 1 and the coordinate origin A is also measured and stored with a position coordinate in the location database to serve as a standard for comparison.

Furthermore, as shown in FIG. 4A and FIG. 4B, a location information related to the position of the electronic devices 101, 102, 103, 104, 110 relative to the hand-held device 1 is defined as a direction data of the hand-held device 1 relative to the electronic devices 101, 102, 103, 104, 110 and detected by the at least one orientation device 20. The direction data comprises a horizontal direction information and a vertical direction information. As shown in FIG. 4A, when the hand-held device 1 points to different electronic devices, the digital compass 22 of the at least one orientation device 20 will detect the horizontal direction information of the electronic devices and the hand-held device 1. As shown in FIG. 4B, when the hand-held device 1 points to different electronic devices, the G-sensor of the hand-held device 1 will detect the vertical direction information of the hand-held device 1 relative to the electronic devices. The horizontal direction information and the vertical direction information will thus enable the computing module 30 to calculate a location information related to the position of the electronic devices 101, 102, 103, 104, 110 relative to the hand-held device 1, and the location information will then be stored in the location database 10 to serve as a standard for subsequent comparison.

Step S3: load the location database 10 into the hand-held device 1.

The location database 10 is loaded into the storing unit of the hand-held device 1 (not shown in a figure) via the communication platform 90 to serve as a standard for subsequent comparison.

Step S4: request whether calibration of the location information is necessary.

When a user 80 is still using the hand-held device 1 at the position P1, calibration will be unnecessary, and step S5 will be executed.

When the user 80 is not using the hand-held device 1 at the position P1, calibration will be necessary, and step S10 will be executed.

Step S5: detect, by at least one orientation device 20, a direction information related to the bearing of the pointed-to electronic device 110 relative to the hand-held device 1.

As shown in FIG. 4, when the hand-held device 1 points to the electronic device 110, at least one orientation device 20 within the hand-held device 1 will detect a direction information (a vertical and horizontal direction information) related to the pointed-to electronic device 110 relative to the hand-held device 1.

Step S6: calculate a pointed-to location information related to the position of the pointed-to electronic device 110 relative to the hand-held device 1 based on the direction information.

In step S6, the computing module 30 calculates the pointed-to location information related to the position of the pointed-to electronic device 110 relative to the hand-held device 1 based on the direction information detected by at least one orientation device 20.

Step S7: compare the pointed-to location information with the location information to distinguish the pointed-to electronic device 110.

The comparing module 40 compares the pointed-to location information with the location information related to the position of the hand-held device 10 relative to the electronic devices 101, 102, 103, 104, 110, so as to locate the electronic device 110 pointed to by the hand-held device 1. Once the comparing module 40 finds the matched location information, the electronic device corresponding to the location information can be located in accordance with the location information that matches the pointed-to location information. In an embodiment of the present disclosure, upon completion of the comparison performed by the comparing module 40, the electronic device 110 pointed to by the hand-held device 1 is a TV set.

A point to note is that, when the comparing module 40 fails to find the matched location information, it will mean that the hand-held device 1 is not present at the position P1, and it will be necessary to execute a calibration step S10 for locating the hand-held device 1 anew.

Step S8: start the control unit 50 for sending a control command.

Once the comparing module 40 of the hand-held device 1 confirms that the pointed-to electronic device 110 is a TV set, the hand-held device 1 will execute a control program for controlling the electronic device 110, and the hand-held device 1 will perform connection control; meanwhile, the control unit 50 of the hand-held device 1 will receive the control command sent from the user 80, such as the control command of starting or shutting down the TV set, so as to achieve the purpose of controlling the pointed-to electronic device 110.

Step S9: send, by the communicating platform 90, the control command to the pointed-to electronic device 110 for controlling the pointed-to electronic device 110.

The control command is issued by the user 80 through the control unit 50 of the hand-held device 1 and then sent to the communicating platform 90 via the transmitting module 60. Subsequently, the pointed-to electronic device 110 receives the control command through the communicating platform 90 to execute a related function, such as start or shutdown.

Figure 5:
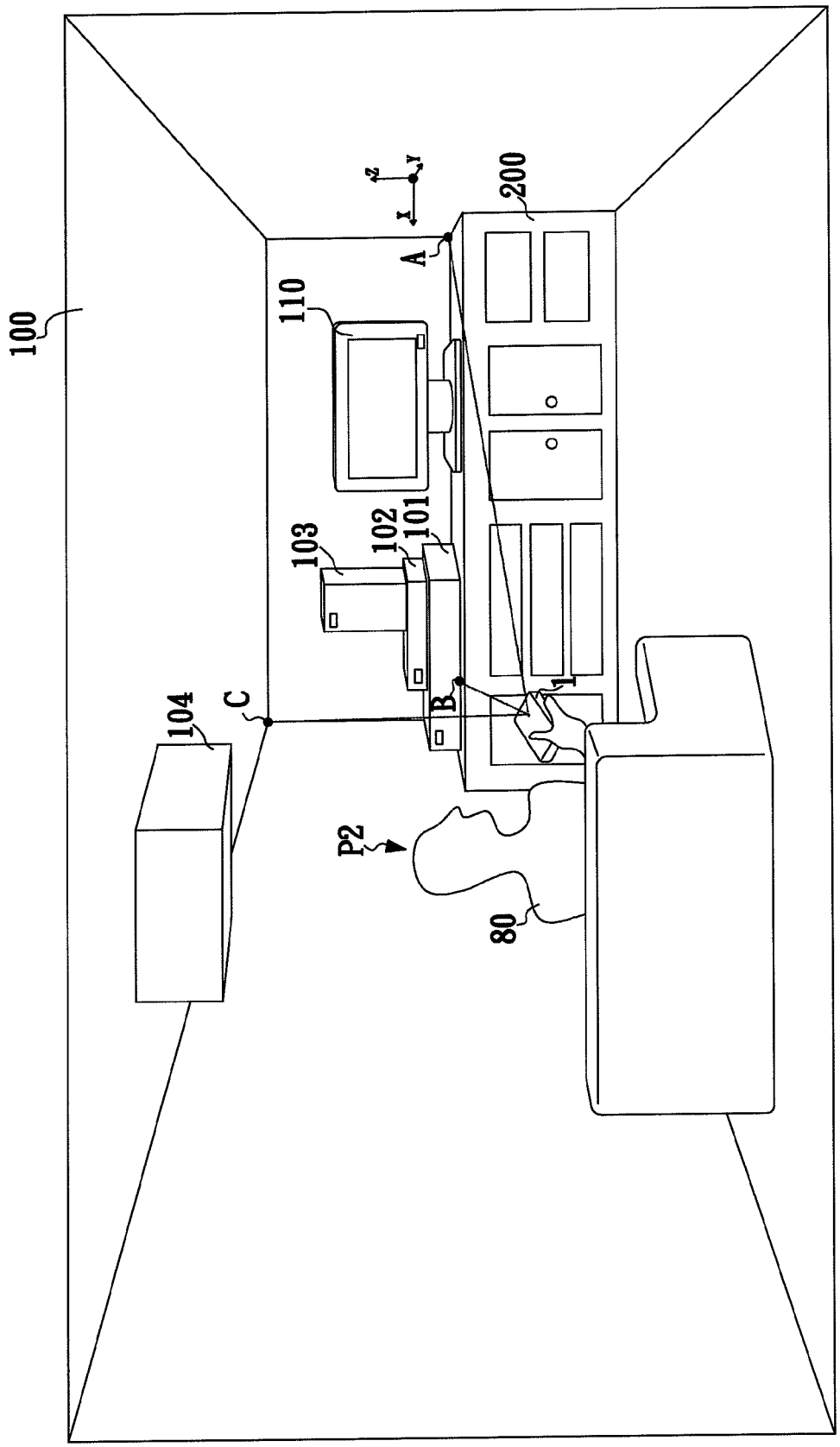
FIG. 5 is a schematic view of pointing to a plurality of reference points by the first embodiment of the hand-held device according to the present disclosure.
Figure 5A:
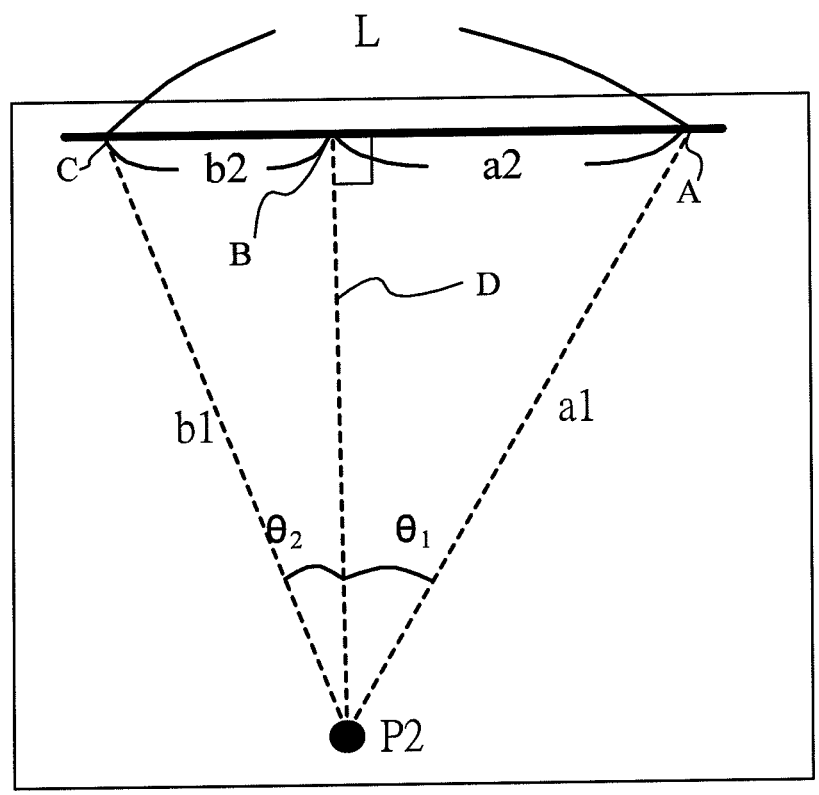
FIG. 5A is a top view of FIG. 5.
Figure 5B:
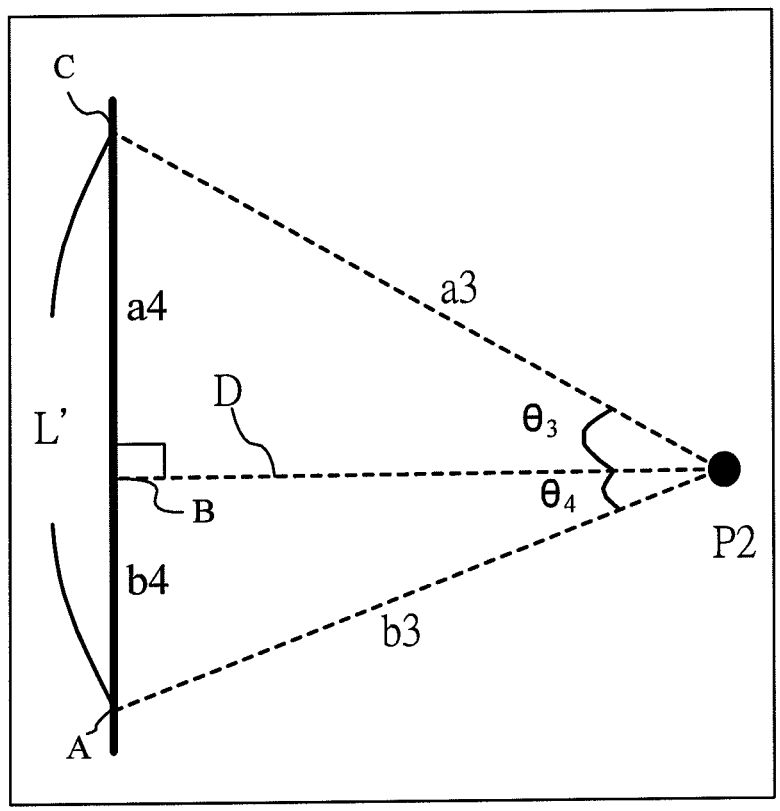
FIG. 5B is a side view of FIG. 5.
Figure 6:
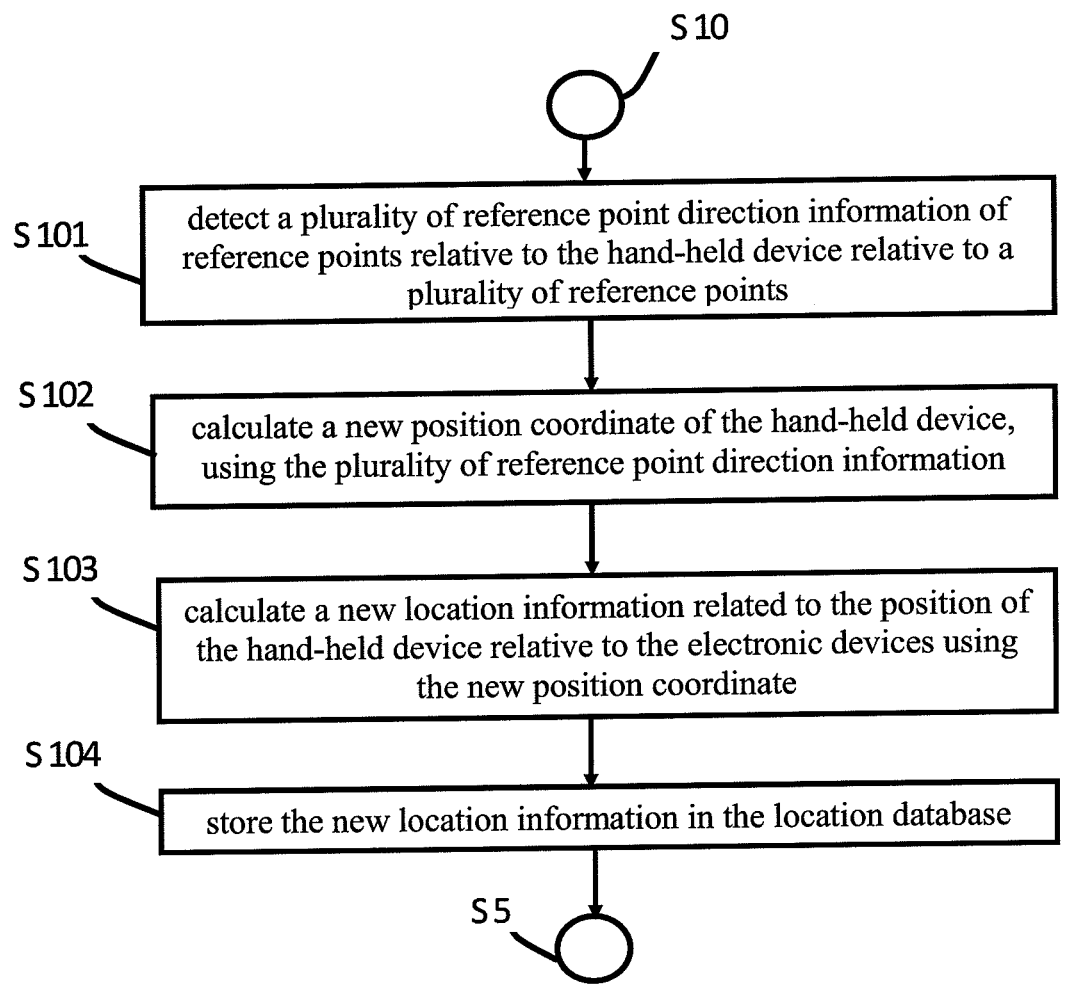
FIG. 6 is a flowchart of calibrating a location information of the first embodiment of the hand-held device relative to the pointed-to electronic device according to the present disclosure.

Please refer to FIG. 5, FIG. 5A, FIG. 5B, and FIG. 6 of the accompanying drawings. FIG. 5 is a schematic view of pointing to a plurality of reference points by the first embodiment of the hand-held device 1 according to the present disclosure. FIG. 5A and FIG. 5B are a top view and a side view of FIG. 5, respectively. FIG. 6 is a flowchart of calibrating the location information of the first embodiment of the hand-held device relative to the pointed-to electronic device according to the present disclosure.

Step S10: start position calibration.

In this embodiment, when the hand-held device 1 is absent from the previous position, for example, when the hand-held device 1 has already moved from the position P1 (FIG. 4) to a position P2 (FIG. 5), the location information related to the position of the hand-held device 1 relative to the electronic devices will change accordingly, and the pointed-to location information, which is comprised of the vertical direction information and the horizontal direction information related to the pointed-to electronic device 110 relative to the hand-held device 1, and detected by at least one orientation device 20 (the G-sensor 21 or the digital compass 22), will also be different from the location information stored in the location database 10; as a result, the comparison performed in step S7 will not yield any matched location information, and the hand-held device 1 will be unable to accurately distinguish the electronic device currently pointed to by the hand-held device 1. Therefore, it is necessary to perform the position calibration step S10 to confirm the position P2 of the hand-held device 1. The first embodiment of the position calibration step S10 comprises the sub-steps as follows:

Step S101: detect a plurality of reference point direction information related to the plurality of reference points of the hand-held device 1 relative to a plurality of reference points.

As shown in FIG. 5, the hand-held device 1 points to three reference points A, B, C so as to detect the direction information related to the three reference points. The direction information related to the three reference points comprises the horizontal and vertical direction information related to the reference points A, B, C. In an embodiment of the present disclosure, the reference points A, B, C are the coordinate origin A, the vertical point B in front of the user 80 (as shown in FIG. 5A and FIG. 5B), and the point C diagonally opposite to the coordinate origin A, respectively. The reference point B has to be the vertical point in front of the user 80. By contrast, selection of the reference point A and the reference point C can be flexible, provided that the reference point A and the reference point C are diagonally opposite to each other; hence, the selection of the reference points A, C is not limited to the aforesaid way of implementation.

Step S102: calculate a new position coordinate of the hand-held device 1, using the plurality of reference point direction information.

The computing module 30 calculates a new position coordinate (the position coordinate of the position P2) of the hand-held device 1 based on the direction information related to reference points A, B, C and detected by at least one orientation device 20, so as to determine the position P2 of the hand-held device 1.

Next, an explanation will be made of an example in which the direction information related to reference points A, B, C is used to calculate a new position coordinate (the position coordinate of the position P2) of the hand-held device 1. Please refer to FIG. 5A and FIG. 5B of the accompanying drawings.

As shown in FIG. 5A, the horizontal angles of the hand-held device 1 pointing to the reference A and the reference C detected by the digital compass 22 are $\theta_1$ and $\theta_2$ and, with the distance L between the reference A and the reference C measured in the step of creating a coordinate system (Step S1), the method for determining the horizontal position coordinate of the position P2 of the hand-held device 1 is as follows:

As shown in FIG. 5A, $a_1$ represents the distance between the reference point A and the position P2 of the hand-held device 1; $a_2$ represents the distance between the reference point A and the reference point B; $b_1$ represents the distance between the reference point C and the position P2 of the hand-held device 1; $b_2$ represents the distance between the reference point B and the reference point C; D represents the distance between the position P2 of the hand-held device 1 and the reference point B. Thus, $a_1$, $a_2$, $b_1$, and $b_2$ may be indicated by the following equations:

$$a_1 \times \sin\theta_1 = a_2 \quad (1)$$

$$b_1 \times \sin\theta_2 = b_2 \quad (2)$$

$$a_2 + b_2 = L \quad (3)$$

$$a_1 \times \cos\theta_1 = D = b_1 \times \cos\theta_2 \quad (4)$$

Substituting the equations (1), (2) into the equation (3) yields the equation:

$$a_1 \times \sin\theta_1 + b_1 \times \sin\theta_2 = L \quad (5)$$

Rearranging the equation (4) yields the equation:

$$a_1 = b_1 \times \cos\theta_2 / \cos\theta_1 \quad (6)$$

Substituting the equation (6) into the equation (5) yields the equation:

$$b_1 \times \frac{\cos\theta_2}{\cos\theta_1} \times \sin\theta_1 + b_1 \times \sin\theta_2 = L \quad (7)$$

Rearranging the equation (7) yields the equation:

$$b_1 = \frac{L}{\frac{\cos\theta_2}{\cos\theta_1} \times \sin\theta_1 + \sin\theta_2} \quad (8)$$

Substituting the equation (8) into the equations (2), (4) yields the equations:

$$b_2 = \frac{L}{\frac{\cos\theta_2}{\cos\theta_1} \times \sin\theta_1 + \sin\theta_2} \times \sin\theta_2 \quad (9)$$

$$D = \frac{L}{\frac{\cos\theta_2}{\cos\theta_1} \times \sin\theta_1 + \sin\theta_2} \times \cos\theta_2 \quad (10)$$

Lastly, substituting the equation (9) into the equation (3) yields the equation:

$$a_2 = L - b_2 = \frac{\cos\theta_2 \times \tan\theta_1 \times L}{\cos\theta_2 \times \tan\theta_1 + \sin\theta_2} \quad (11)$$

The method for determining the vertical position coordinate of the position P2 of the hand-held device 1 is as follows: As shown in FIG. 5B, a G-sensor 21 detects the gravity components of the hand-held device 1 pointing to the reference point A and the reference point B, further calculating inclination angles as θ3 and θ4. As shown in 5B, $a_3$ represents the distance between the reference A and the position P2 of the hand-held device 1; $a_4$ represents the distance between the reference A and the reference B; $b_3$ represents the distance between the reference point C and the position P2 of the hand-held device 1; $b_4$ represents the distance between the reference point B and the reference point C; D represents the distance between the position P2 of the hand-held device 1 and the reference point B. Thus, $a_3, a_4, b_3, b_4$ can be indicated by the following equations:

$$a_3 \times \sin\theta_3 = a_4 \quad (12)$$

$$b_3 \times \sin\theta_4 = b_4 \quad (13)$$

$$a_4 + b_4 = L' \quad (14)$$

$$a_3 \times \cos\theta_3 = D = b_3 \times \cos\theta_4 \quad (15)$$

Substituting the equations (12), (13) into the equation (3) yields the equation:

$$a_3 \times \sin\theta_3 + b_3 \times \sin\theta_4 = L' \quad (16)$$

Rearranging the equation (15) yields the equation:

$$a_3 = b_3 \times \frac{\cos\theta_4}{\cos\theta_3} \quad (17)$$

Substituting the equation (17) into the equation (16) yields the equation:

$$b_3 \times \frac{\cos\theta_4}{\cos\theta_3} \times \sin\theta_3 + b_3 \times \sin\theta_4 = L' \quad (18)$$

Rearranging the equation (18) yields the equation:

$$b_3 = \frac{L'}{\frac{\cos\theta_4}{\cos\theta_3} \times \sin\theta_3 + \sin\theta_4} \quad (19)$$

Substituting the equation (19) into the equations (13), (15) yields the equations:

$$b_4 = \frac{L'}{\frac{\cos\theta_4}{\cos\theta_3} \times \sin\theta_3 + \sin\theta_4} \times \sin\theta_4 \quad (20)$$

$$D = \frac{L'}{\frac{\cos\theta_4}{\cos\theta_3} \times \sin\theta_3 + \sin\theta_4} \times \cos\theta_4 \quad (21)$$

Lastly, substituting the equation (20) into the equation (14) yields the equation:

$$a_4 = L' - b_4 = \frac{\cos\theta_4 \times \tan\theta_3 \times L'}{\cos\theta_4 \times \tan\theta_3 + \sin\theta_4} \quad (22)$$

If the coordinate of the reference point A is (0,0,0), the coordinate of the reference point C will be (–L, 0, 0); the X-coordinate of the position P2 of the hand-held device 1 can be indicated as $-a_2$; the Y-coordinate of the position P2 of the hand-held device 1 can be indicated as $a_4$; the Z-coordinate of the position P2 of the hand-held device 1 can be indicated as $-D$. Thus, the position coordinate of the position P2 of the hand-held device 1 is $(-a_2, a_4, -D)$. Rewriting $(-a_2, a_4, -D)$ with the related equations expanded and simplified yields the position coordinate of the position P2 of the hand-held device 1:

$$\begin{pmatrix} \frac{-\cos\theta_2 \times \tan\theta_1 \times L}{\cos\theta_2 \times \tan\theta_1 + \sin\theta_2}, \\ \frac{\cos\theta_4 \times \tan\theta_3 \times L'}{\cos\theta_4 \times \tan\theta_3 + \sin\theta_4}, \\ \frac{-\cos\theta_2 \times L}{\cos\theta_2 \times \tan\theta_1 + \sin\theta_2} \end{pmatrix}$$

Step S103: calculate a new location information related to the position of the hand-held device 1 relative to the electronic devices 101, 102, 103, 104, 110, using the new position coordinate.

After determining the position P2 of the hand-held device 1, the computing module 30 calculates the new location information related to the position of the hand-held device 1 relative to the electronic devices 101, 102, 103, 110 anew.

Step S104: store the new location information in the location database 10.

The new location information calculated after position calibration is stored in the location database 10; meanwhile, the position calibration step S10 is finished, and it is necessary to go back to step S5.

After the position calibration step S10 is finished, the comparing module 40 of the hand-held device 1 distinguishes the pointed-to electronic device when the hand-held device 1 is present at the position P2 and confirms the pointed-to electronic device in steps S5-S7 before performing the subsequent corresponding operation. The aforesaid steps are the same as step S4-S9 and thus are not described repeatedly.

The method for controlling electronic devices according to the present disclosure is not limited by the step sequence disclosed therein; instead, changes can be made to the step sequence disclosed in the present disclosure, provided that the objectives of the present disclosure are achieved.

Figure 7:
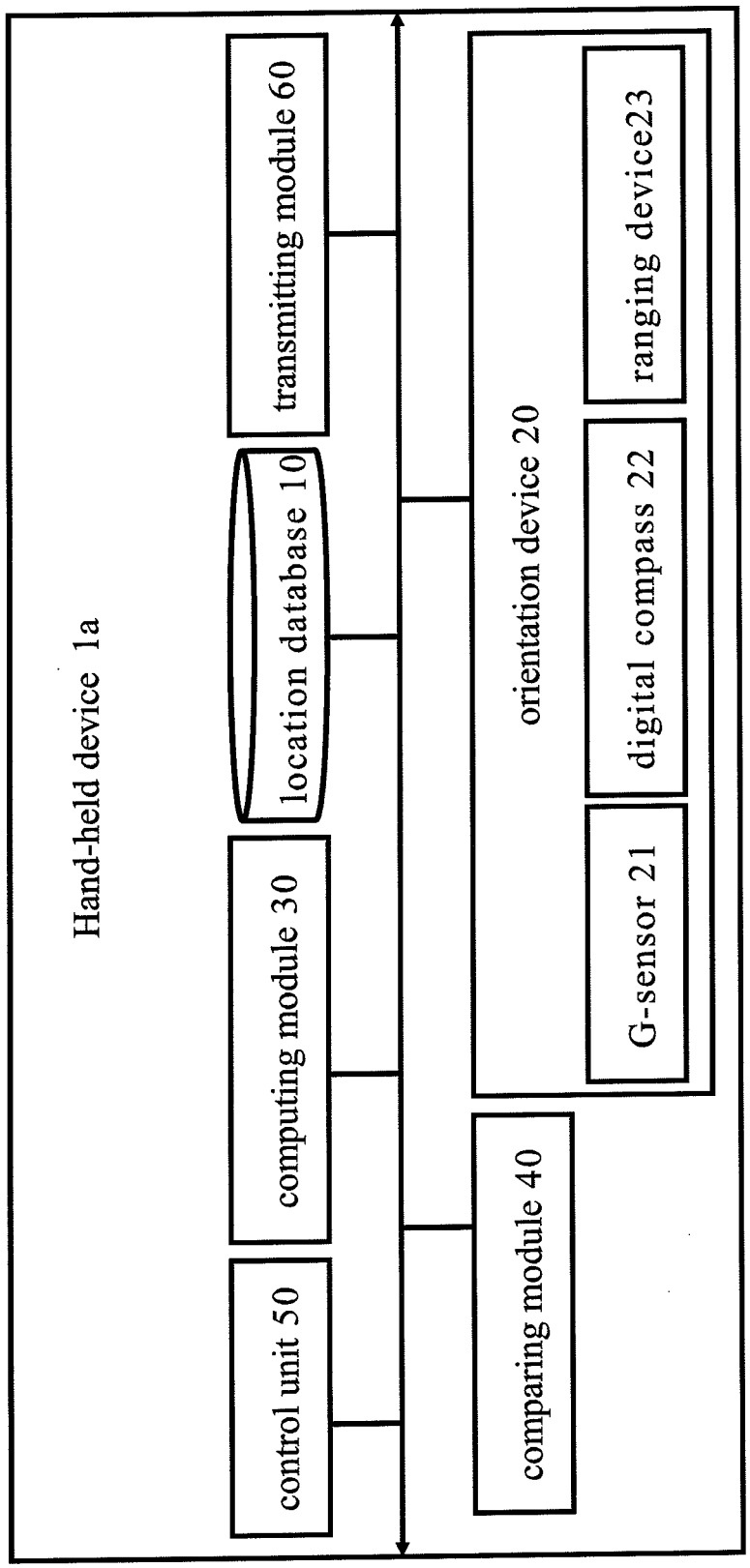
FIG. 7 is a hardware structure diagram of the second embodiment of the hand-held device according to the present disclosure.

Referring to FIG. 1 and FIG. 7 of the accompanying drawings, FIG. 7 is a hardware structure diagram of the second embodiment of the hand-held device according to the present disclosure. As shown in FIG. 1, the hand-held device 1a of the second embodiment of the present disclosure communicates with the at least one of the electronic devices 101, 102, 103, 104, 110 via the communicating platform 90 such that, when the hand-held device 1a points to any one of the electronic devices 101, 102, 103, 104, 110, the hand-held device 1a can control the pointed-to electronic device. In this embodiment, the hand-held device 1a is a personal digital assistant (PDA), but the present disclosure is not limited thereto, for the hand-held device 1a can also be a desktop computer, a notebook computer, a tablet computer, a cell phone, or any other electronic device capable of communicating with the communicating platform 90.

As shown in FIG. 7, the hand-held device 1a of the second embodiment of the present disclosure comprises a location database 10, at least one orientation device 20, a computing module 30, a comparing module 40, a control unit 50, and a transmitting module 60. The at least one orientation device 20 detects a direction information related to the pointed-to electronic device 110 relative to the hand-held device 1a. The direction information comprises information related to a distance, a horizontal angle direction information, and an inclination angle direction of the pointed-to electronic device 110 relative to the hand-held device 1. A point to note is that the greatest difference between the hand-held device 1 of the second embodiment 2 and the hand-held device 1 of the first embodiment is that at the least one orientation device 20 includes a G-sensor 21, a digital compass 22, and a ranging device 23, used respectively for detecting an inclination angle direction, a horizontal angle direction information, and a distance of the pointed-to electronic device 110 relative to the hand-held device 1a, wherein the ranging device 23 can be an infrared sensor, a distance detector, or a camera head capable of capturing images, or other distance-detecting devices, but the present disclosure is not limited thereto. The location database stores position coordinates of the electronic devices 101, 102, 103, 104, 110 and the hand-held device 1a relative to the reference point R and stores a location information related to a position of the electronic devices 101, 102, 103, 104, 110 relative to the hand-held device 1a. The location database 10 is stored in the storing unit (not shown in a figure) of the hand-held device 1a, but the present disclosure is not limited thereto. A point to note is that the location database 10 can be stored in an online cloud server. When the hand-held device 1a of the present disclosure is used by a user for controlling the electronic devices, the user can load the location database 10 into the hand-held device 1a via the communication platform 90. The computing module is electrically connected to a G-sensor 21, a digital compass 22, and a ranging device 23 for calculating a pointed-to location information related to a position of the pointed-to electronic device relative to the hand-held device 1a based on the direction information detected by the G-sensor 21, the digital compass 22, and the ranging device 23. The comparing module 40 is electrically connected to the computing module 30 and the location database 10 respectively for comparing the pointed-to location information calculated by the computing module 30 with the location information stored in the location database 10 to distinguish the pointed-to electronic device 110. The control unit 50 is electrically connected to the comparing module 40 for sending a control command to enable the pointed-to electronic device 110 to execute a related function, for example, starting or shutting down the pointed-to electronic device 110, so as to achieve the purpose of controlling the pointed-to electronic device 110. The transmitting module 60 is electrically connected to the control unit 50 for sending the control command to the pointed-to electronic device 110 via the communicating platform 90. A point to note is that the aforesaid modules and devices can be a hardware device, a software program, firmware, a circuit loop, or a combination thereof. In an embodiment of the present disclosure, at least one orientation device 20 comprises the G-sensor 21, the digital compass 22, and the ranging device 23, but the present disclosure is not limited thereto, for at least one orientation device 20 can also be any device capable of detecting a direction information.

Figure 8:
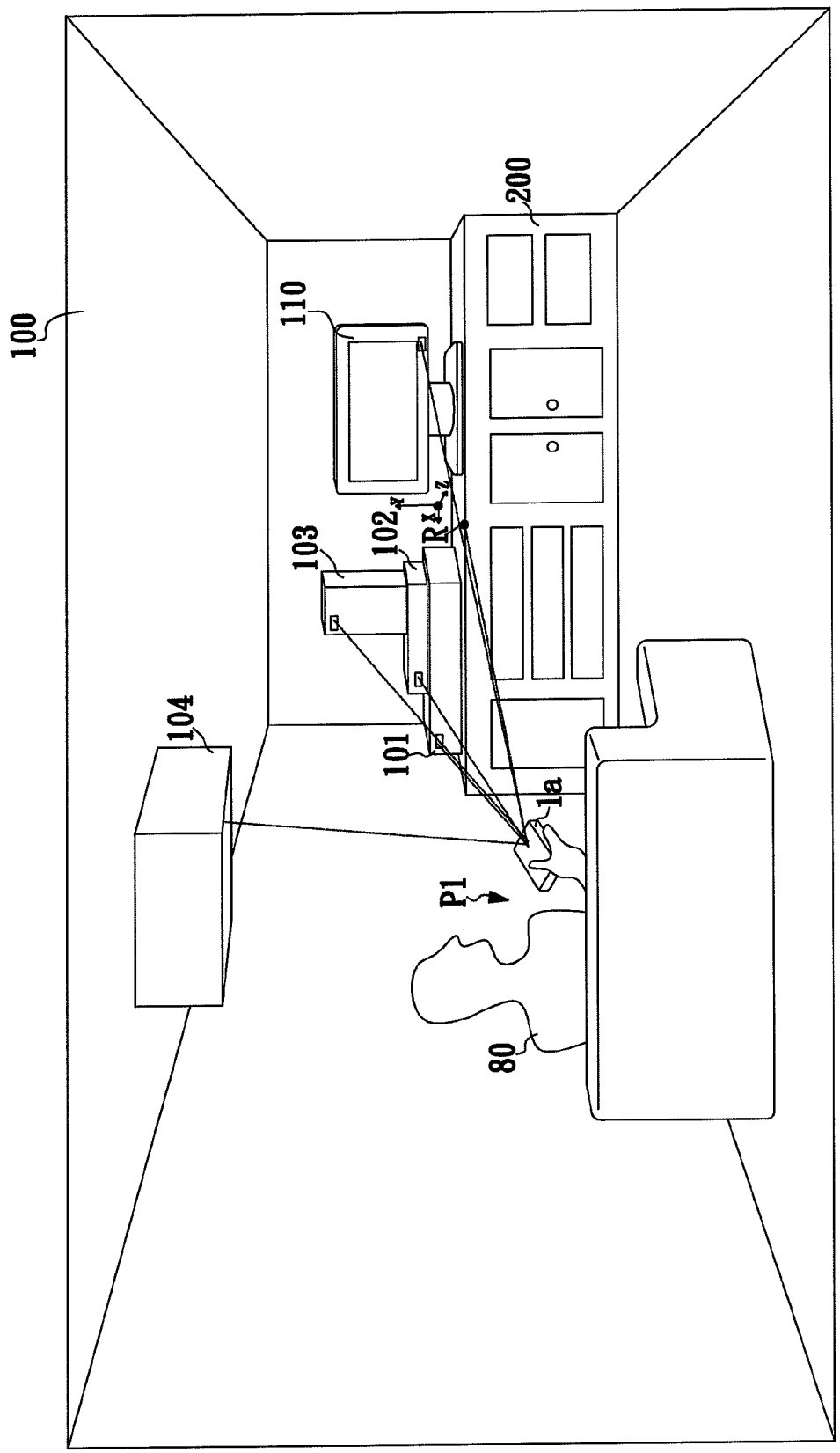
FIG. 8 is a schematic view of a communication environment of the second embodiment of a hand-held device of the present disclosure.
Figure 8A:
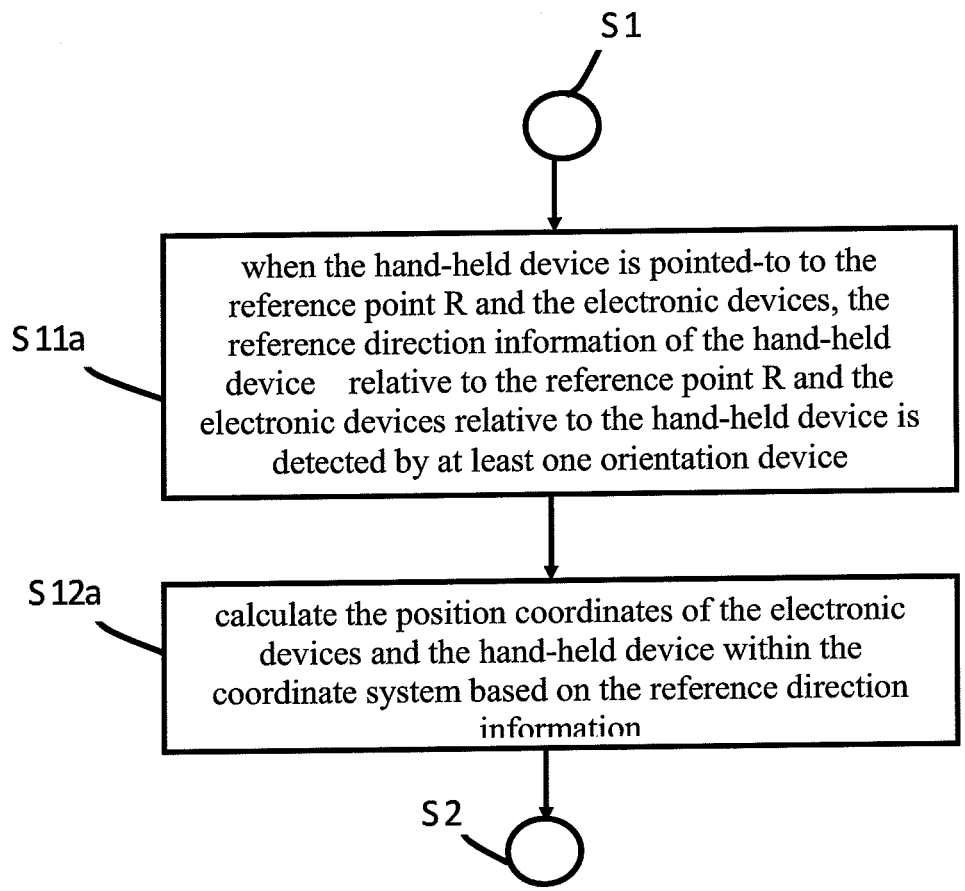
FIG. 8A is a flowchart of the second embodiment of a method for controlling electronic devices to create a coordinate system according to the present disclosure.
Figure 8B:
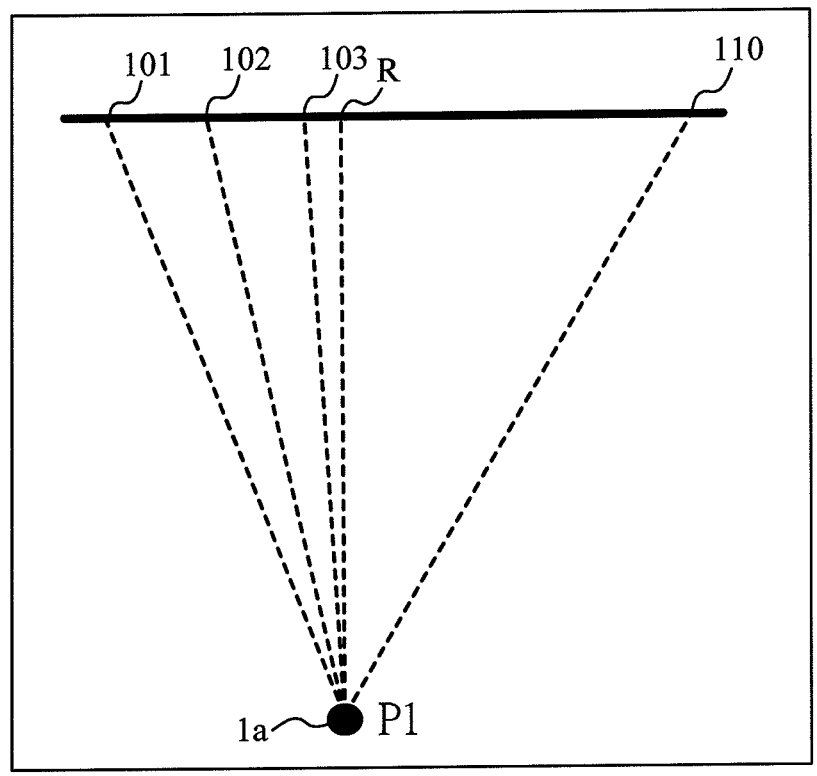
FIG. 8B is a top view of FIG. 8.
Figure 8C:
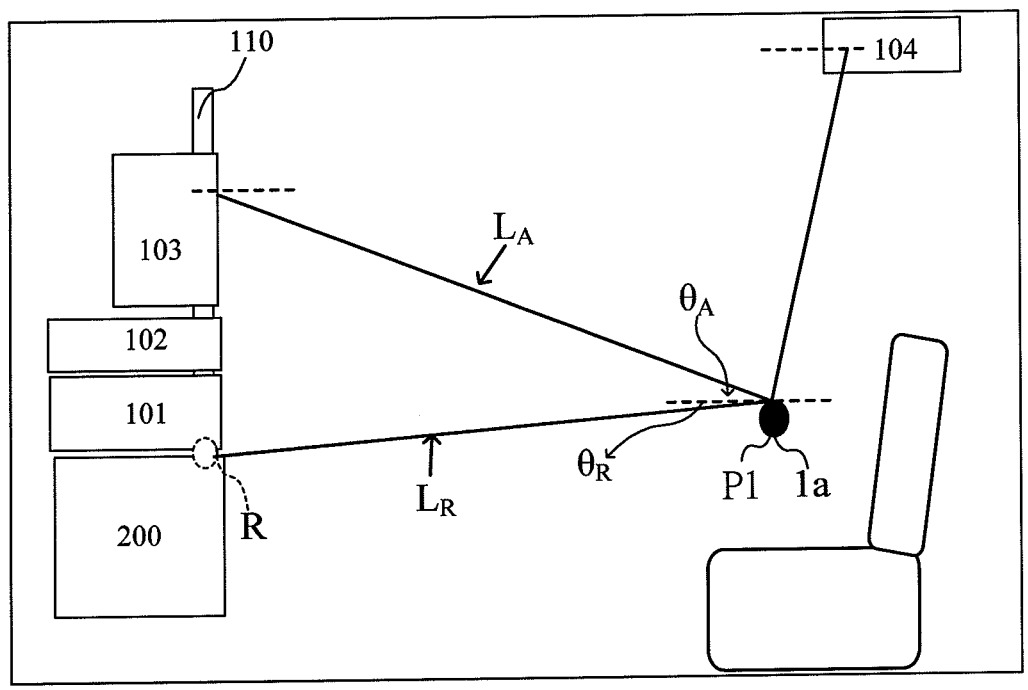
FIG. 8C is a side view of FIG. 8.
Figure 8D:
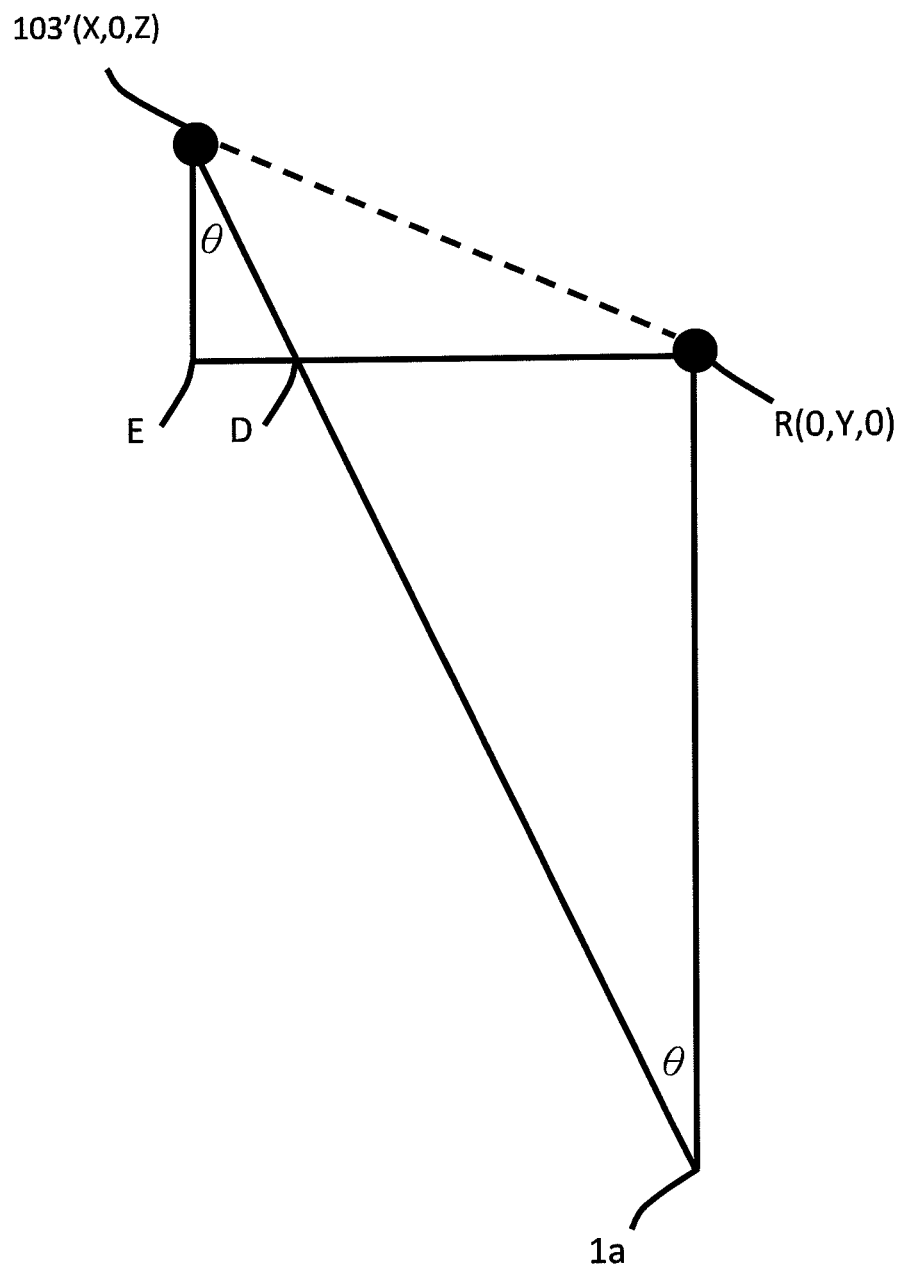
FIG. 8D is a projection plan view of creating, by the method for controlling electronic devices of the second embodiment in accordance with the present disclosure, a position coordinate of the electronic devices according to the present disclosure.

Referring to FIG. 3, FIG. 8, FIG. 8A, FIG. 8B, FIG. 8C, and FIG. 8D of the accompanying drawings, FIG. 3 is a flowchart of a method for controlling electronic devices according to the present disclosure; FIG. 8 is a schematic view of a communication environment of the second embodiment of a hand-held device of the present disclosure; FIG. 8A is a flowchart of the second embodiment of a method for controlling electronic devices to create a coordinate system according to the present disclosure; FIG. 8B is a top view of FIG. 8; FIG. 8C is a side view of FIG. 8; FIG. 8D is a projection plan view of creating, by the method for controlling electronic devices of the second embodiment in accordance with the present disclosure, a position coordinate of the electronic devices according to the present disclosure.

As shown in FIG. 3 and FIG. 8, the second embodiment of a method for controlling electronic devices according to the present disclosure enables the hand-held device 1a to communicate with at least one of the electronic devices 101, 102, 103, 104, 110 via the communicating platform 90 such that, when the hand-held device 1 points to at least one of the electronic devices 101, 102, 103, 104, 110, such as the electronic device 110, the hand-held device 1 can control the pointed-to electronic device 110. The method for controlling electronic devices according to the present disclosure comprises the steps as follows:

Step S1: create a coordinate system in a space 100 accommodating the electronic devices 101, 102, 103, 104, 110.

Taking FIG. 8 as an example, in the space 100, a three-dimensional coordinate system (comprising the x-coordinate, the y-coordinate, and the z-coordinate) is created, by seeing a reference point R as the coordinate origin, such that each of the electronic devices 101, 102, 103, 104, 110 within the coordinate system can be located by a position coordinate. In an embodiment of the present disclosure, the space 100 is a living room, but the indication of this embodiment is not limited thereto. The present disclosure is also applicable outdoors. A point to note is that the reference point R is changeable, and is not limited by the indication of this embodiment. A point to note is that creating the coordinates of this embodiment further comprises the sub-steps as follows; please refer to FIG. 8 and FIG. 8A of the accompanying drawing.

Step S11a: when the hand-held device 1a is pointed to the reference point R and the electronic devices 101, 102, 103, 104, 110, the reference direction information of the hand-held device 1 relative to the reference point R and the electronic devices 101, 102, 103, 104, 110 relative to the hand-held device 1 is detected by at least one orientation device 20.

As shown in FIG. 8, when creating a coordinate system, the hand-held device 1a points to the reference point R and the electronic devices 101, 102, 103, 104, 110, and the reference direction information of the hand-held device 1a relative to the reference point R and the electronic devices 101, 102, 103, 104, 110 relative to the hand-held device 1a is detected by the G-sensor 21, the digital compass 22, and the ranging device 23. The reference direction information comprises information related to a distance, a horizontal angle direction, and an inclination angle direction of the hand-held device 1a relative to the reference point R and information related to a distance, a horizontal angle direction, and an inclination angle direction of the hand-held device 1a respectively to the electronic devices 101, 102, 103, 104, 110, so as to create the position coordinates related to the hand-held device 1a and the electronic devices 101, 102, 103, 104, 110 within the coordinate system.

Step S12a: calculate the position coordinates of the electronic devices 101, 102, 103, 104, 110 and the hand-held device 1a within the coordinate system based on the reference direction information.

The reference direction information detected by the G-sensor 21, the digital compass 22, and the ranging device 23 can be used to calculate the position coordinates related to the hand-held device 1a and the electronic devices 101, 102, 103, 104, 110 within the coordinate system. Next an explanation will be made using the digital compass 22 as an example to illustrate how the position coordinate of the electronic device 103 is calculated based on the reference direction information. For convenience, please refer to FIG. 8, FIG. 8B, FIG. 8C, and FIG. 8D of the accompanying drawings. A point to note is that FIG. 8D is a projection plan view of FIG. 8, and the electronic devices 103 in FIG. 8 and the electronic devices 103' in FIG. 8D refer to the same object, wherein the coordinate of the electronic devices 103' in FIG. 8D lacks the vertical height (meaning the Y-coordinate is 0).

As shown in FIGS. 8C and 8D, it is assumed that the ranging device 23 detects the distance between the hand-held device 1a and the electronic device 103 as $L_A$, and detects the distance between the hand-held device 1a and the reference point R as $L_R$; the digital compass 22 detects the horizontal angle as $\theta$; the G-sensor 21 detects the gravity components between the hand-held device 1a and the electronic device 103, further calculating an inclination angle as $\theta_A$, and the G-sensor 21 detects the gravity components between the hand-held device 1a and the reference point R, further calculating an inclination angle as $\theta_R$.

Based on the data described above, in FIG. 8D, the horizontal projection distance between the hand-held device 1a and the electronic device 103' can be indicated as $L_A'=L_A\times\cos\theta_A$, and also with the horizontal projection distance between the hand-held device 1a and the reference point R indicated as $L_R'=L_A\times\cos\theta_R$, the distance between the hand held-device 1a and the point D indicated as $L_R'\times 1/\cos\theta$, the distance between the point D and the electronic device 103' indicated as $L_A'-L_R'\times 1/\cos\theta$, the distance between the points D and E indicated as $(L_A'-L_R'\times 1/\cos\theta)\times\sin\theta$, and the distance between the point E and the electronic device 103' indicated as $(L_A'-L_R'\times 1/\cos\theta)\cos\theta$. As shown in FIG. 8D, the coordinate of the electronic device 103' is (X, 0, Z), wherein the X-coordinate value can be indicated by the distance between the point D and the reference point R, in addition to the distance between the points D and E. The distance between the point D and the reference point R can be indicated as $L_R'\times\tan\theta$, so the X-coordinate can be indicated as $L_A'\times\tan\theta+(L_A'-L_R'\times 1/\cos\theta)\times\sin\theta$. The Z-coordinate value can be indicated by the distance between the point E and the electronic device 103': $(L_A'-L_R'1/\cos\theta)\times\cos\theta$, so the position coordinate of the electronic device 103' can be indicated as (x,0,z): $(L_R'\times\tan\theta+(L_A'-L_R'\times\cos\theta)\times\sin\theta, L_A\times\sin\theta_A-L_R\times\sin\theta_R, (L_A'-L_R'\times 1/\cos\theta)\times\sin\theta)$. Then, calculate the Y-coordinate indicating the vertical height for finding the position coordinate of the electronic device 103' within the coordinate system with the reference point R as a coordinate origin, $(L_R'\times\tan\theta+(L_A'-L_R'\times\cos\theta)\times\sin\theta, 0, (L_A'-L_R'\times 1/\cos\theta)\times\sin\theta)$. Accordingly, the position coordinates related to the electronic devices 101, 102, 103, 104, 110 within the coordinate system with the reference point R as a coordinate origin can be calculated respectively, thereby the detailed processes for calculating the position coordinates of the electronic devices 101, 102, 103, 104, 110 are not described repeatedly.

A point to note is that the greatest difference between the methods for controlling electronic devices of this embodiment and the first embodiment is in the coordinate system creating method. Creating the coordinates of the first embodiment requires actual measurement of the distances between the electronic devices 101, 102, 103, 104, 110 and the coordinate origin A in FIG. 4; creating the coordinate system of this embodiment requires the reference direction information detected by a G-sensor 21, a digital compass 22, and a ranging device 23, so as to calculate the position coordinates related to the electronic devices 101, 102, 103, 104, 110 within the coordinate system with the reference point R as a coordinate origin.

Step S2: store the position coordinates of the electronic devices 101, 102, 103, 104, 110 and the hand-held device 1a within the coordinate system and a location information related to the position of the electronic devices 101, 102, 103, 104, 110 relative to the hand-held device 1a in the location database 10.

Upon completion of creating the coordinate system, the position coordinates of the electronic devices 101, 102, 103, 104, 110 within the coordinate system and the position coordinate of a position P1 of the hand-held device 1a within the coordinate system are stored in the location database 10. In general, once electronic devices are placed in a space like a living room, their positions in the space will remain unchanged; hence, the position coordinates of the electronic devices 101, 102, 103, 104, 110 in the space 100 are deemed constant.

The complete calculation of the position coordinates of the electronic devices 101, 102, 103, 104, 110 and the hand-held device 1a thus enables the computing module 30 to calculate a location information related to the position of the electronic devices 101, 102, 103, 104, 110 relative to the hand-held device 1a, and the location information is then stored in the location database 10 to serve as a standard for subsequent comparison.

Step S3: load the location database 10 to the hand-held device 1a.

The location database 10 is loaded into the hand-held device 1a via the communication platform 90 and stored in the storing unit of the hand-held device 1a (not shown in a figure) to serve as a standard for subsequent comparison.

Step S4: request whether calibration of the location information is necessary.

When a user 80 is still using the hand-held device 1a at the position P1, calibration will be unnecessary, and step S5 will be executed.

When the user 80 is using the hand-held device 1 at a position other than position P1, calibration will be necessary, and step S10 will be executed.

Step S5: detect, by at least one orientation device 20, a direction information related to the pointed-to electronic device 110 relative to the hand-held device 1a.

As shown in FIG. 8, when the hand-held device 1a points to the electronic device 110, the G-sensor 21, the digital compass 22, and the ranging device 23 in the hand-held device 1a will detect a direction information (related to a distance, a horizontal angle direction, and an inclination angle direction) between the hand-held device 1a and the pointed-to electronic device 110.

Step S6: calculate a pointed-to location information related to the position of the pointed-to electronic device 110 relative to the hand-held device 1a based on the direction information.

In step S6, the computing module 30 calculates the pointed-to location information related to the position of the pointed-to electronic device 110 relative to the hand-held device 1a based on the direction information detected by at least one orientation device 20.

Step S7: compare the pointed-to location information with the location information to distinguish the pointed-to electronic device 110.

The comparing module 40 compares the pointed-to location information with the location information related to the position of the hand-held device 10 relative to the electronic devices 101, 102, 103, 104, 110 so as to locate the electronic device 110 pointed to by the hand-held device 1a. Once the comparing module 40 finds the matched location information, the electronic device corresponding to the location information can be located in accordance with the location information that matches the pointed-to location information. In an embodiment of the present disclosure, upon completion of the comparison performed by the comparing module 40, the electronic device 110 pointed at by the hand-held device 1a is a TV set.

A point to note is that, when the comparing module 40 fails to find the matching location information, it will mean that the hand-held device 1a is not present at the position P1, and it will be necessary to execute a calibration step S10 for locating the hand-held device 1 anew.

Step S8: start the control unit 50 for sending a control command.

Once the comparing module 40 of the hand-held device 1a confirms that the pointed-to electronic device 110 is a TV set, the hand-held device 1a will execute a control program for controlling the electronic device 110, and the hand-held device 1a will perform connection control; meanwhile, the control unit 50 of the hand-held device 1a receives the control command sent from the user 80, such as the control command of starting or shutting down the TV set, so as to achieve the purpose of controlling the pointed-to electronic device 110.

Step S9: send, by the communicating platform 90, the control command to the pointed-to electronic device 110 for controlling the pointed-to electronic device 110.

The control command is issued by the user 80 through the control unit 50 of the hand-held device 1a, and then sent to the communicating platform 90 via the transmitting module 60. Subsequently, the pointed-to electronic device 110 receives the control command through the communicating platform 90 to execute a related function, such as start or shutdown.

Figure 9:
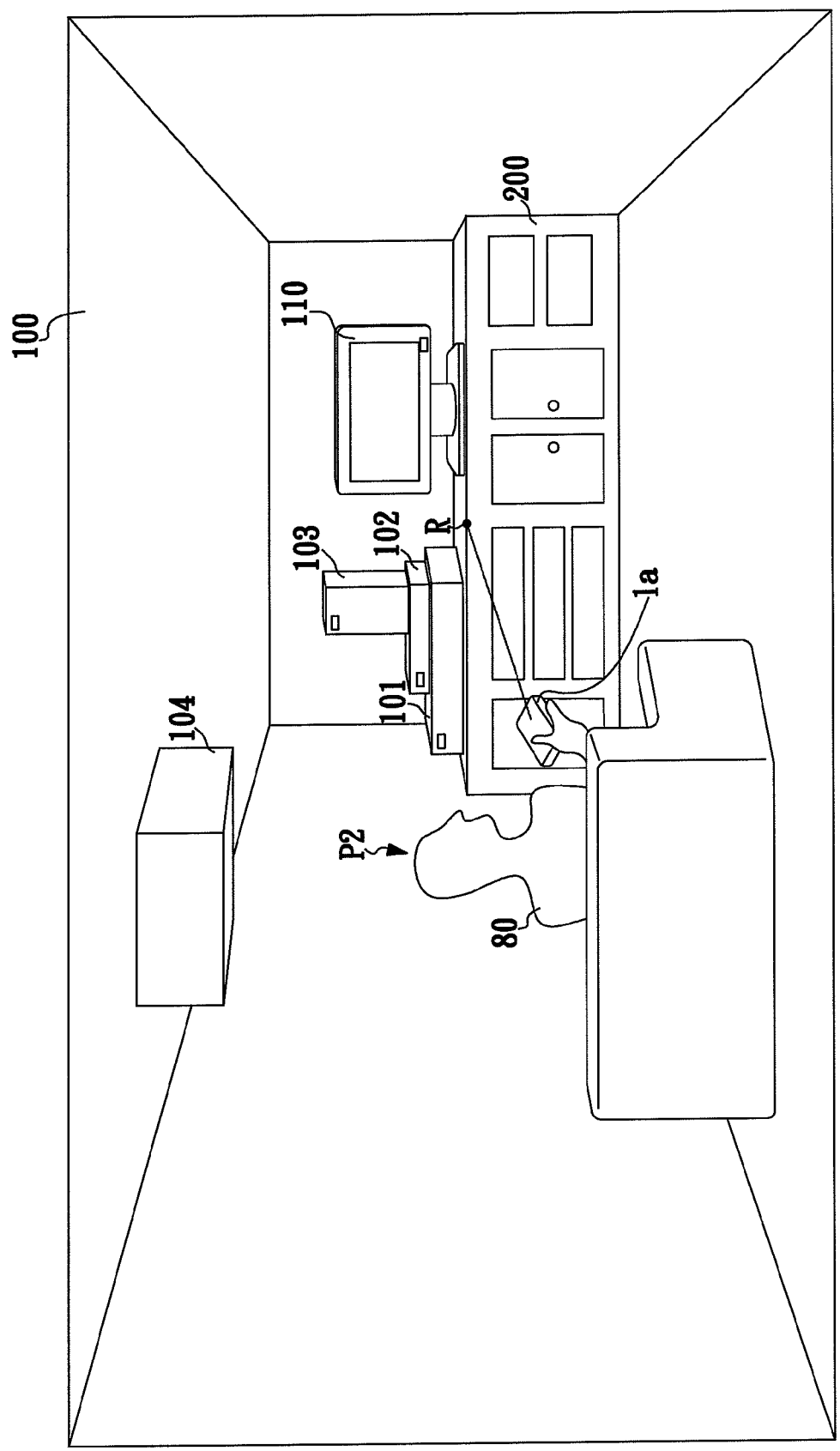
FIG. 9 is a schematic view of pointing to reference points by the hand-held device according to the present disclosure.
Figure 9A:
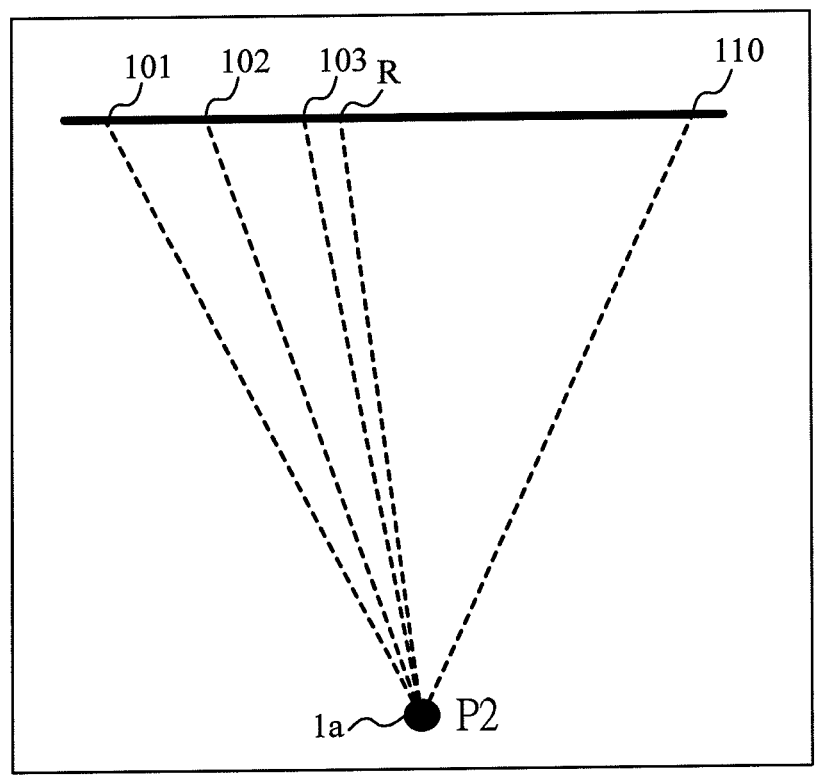
FIG. 9A is a top view of pointing to electronic devices by the hand-held device according to the present disclosure.
Figure 9B:
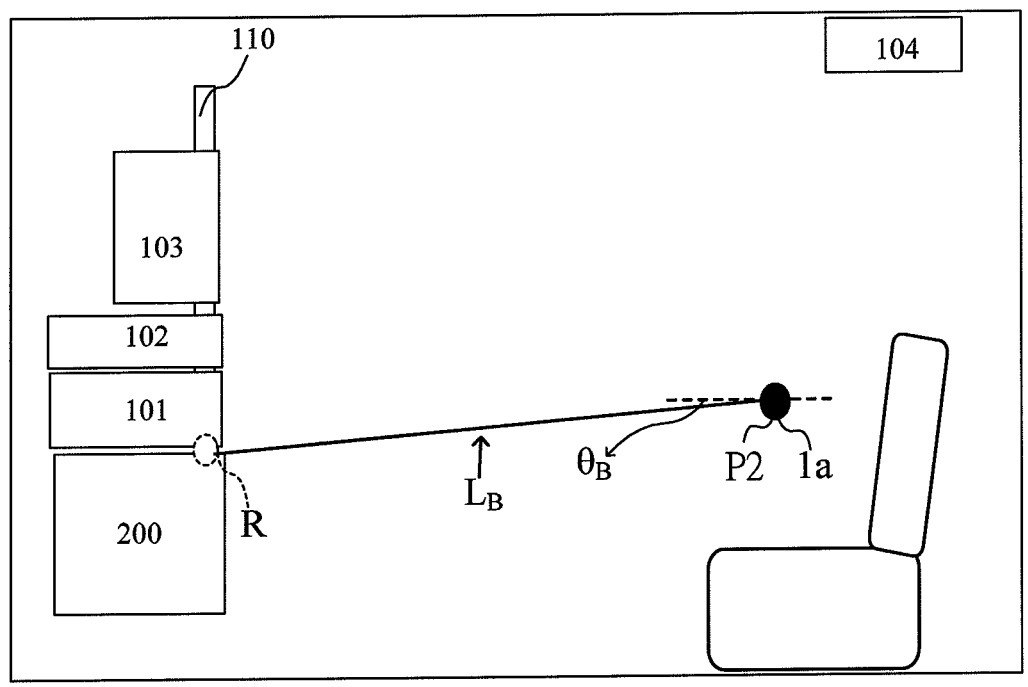
FIG. 9B is a side view of FIG. 9.
Figure 9C:
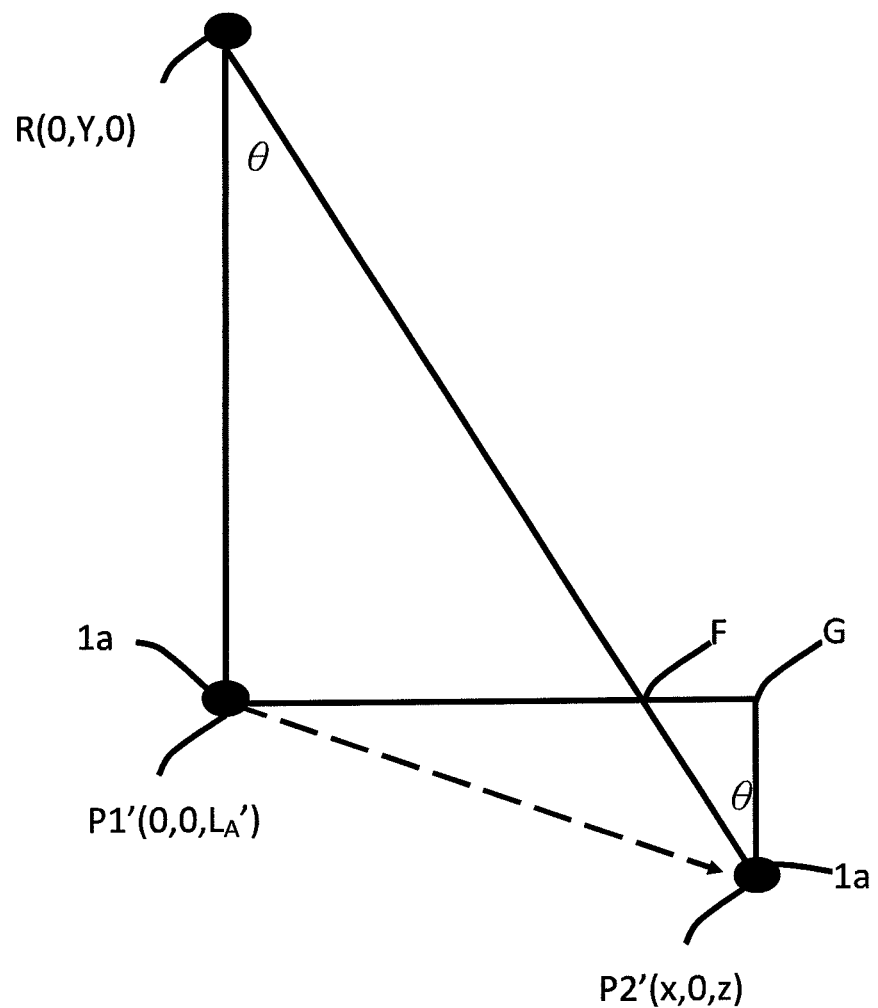
FIG. 9C is a projection plan view of creating, by the method for controlling electronic devices in accordance with the present disclosure, a new position coordinate of the hand-held device according to the present disclosure.
Figure 10:
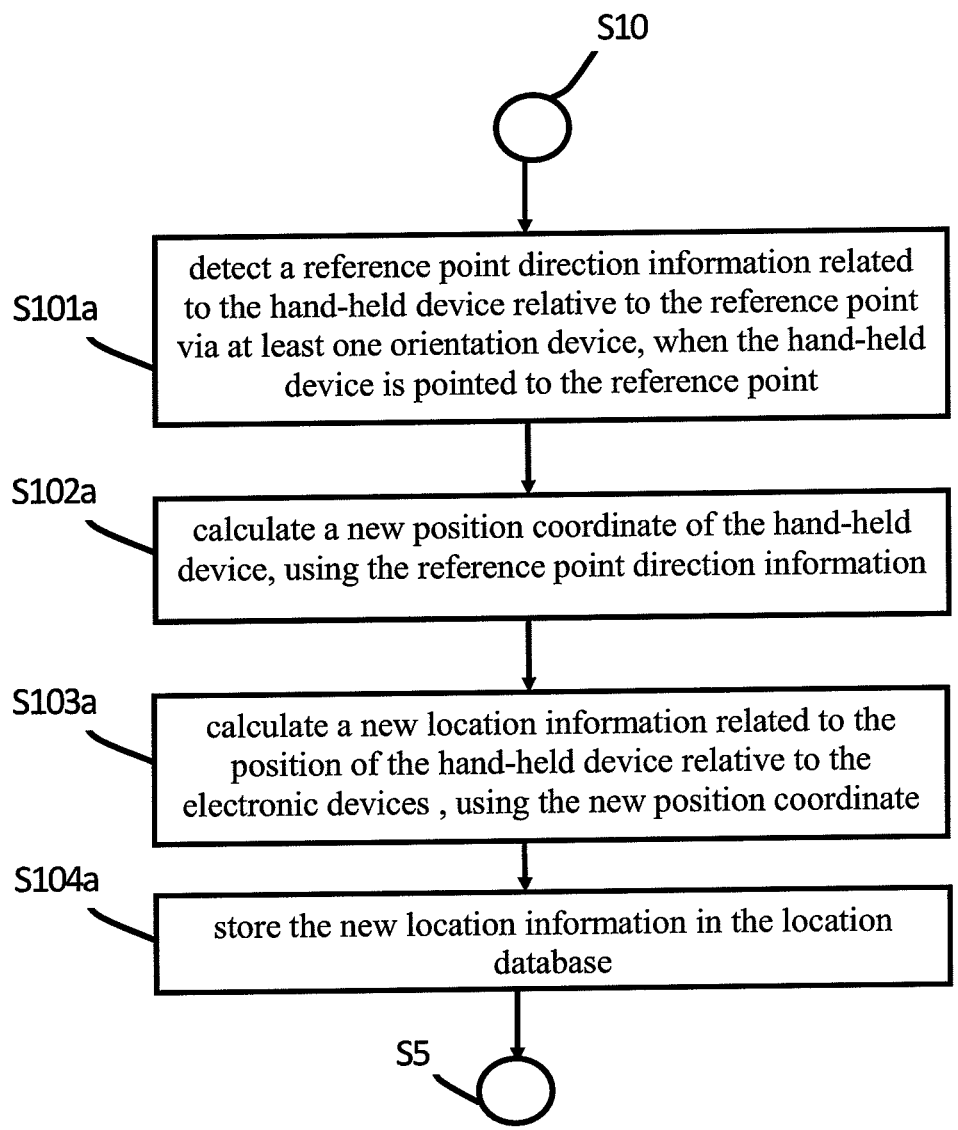
FIG. 10 is a flowchart of the second embodiment of calibrating a location information of the hand-held device relative to the pointed-to electronic device according to the present disclosure.

Referring to FIG. 9, FIG. 9A, FIG. 9B, and FIG. 9C, FIG. 9 is a schematic view of pointing to reference points by the hand-held device according to the present disclosure; FIG. 9A is a top view of pointing to electronic devices by the hand-held device according to the present disclosure; FIG. 9B is a side view of FIG. 9; FIG. 9C is a projection plan view of creating, by the method for controlling electronic devices in accordance with the present disclosure, a new position coordinate of the hand-held device according to the present disclosure; FIG. 10 is a flowchart of the second embodiment of calibrating a location information of the hand-held device relative to the pointed-to electronic device according to the present disclosure.

Step S10: start position calibration.

In this embodiment, when the hand-held device 1a is absent from the previous position, for example, when the hand-held device 1a has already moved from the position P1 (FIG. 8) to a position P2 (FIG. 9), the location information related to the position of the hand-held device 1a relative to the electronic devices will change accordingly, and the pointed-to location information, which is comprised of the distance, the horizontal angle direction, and the inclination angle direction related to the pointed-to electronic device 110 relative to the hand-held device 1a, and detected by a G-sensor 21, a digital compass 22, and a ranging device 23, will also be different from the location information stored in the location database 10; as a result, the comparison performed in step S7 does not yield any matched location information, and the hand-held device 1a cannot accurately distinguish the electronic device currently pointed to by the hand-held device 1a. Therefore, it is necessary to perform the position calibration step S10 to confirm the position P2 of the hand-held device 1a. The second embodiment of the position calibration step S10 comprises the sub-steps as follows: please refer to FIG. 10 of the accompany drawing.

Step S101a: detect a reference point direction information related to the hand-held device 1a relative to the reference point R via at least one orientation device, when the hand-held device 1a is pointed to the reference point R.

As shown in FIG. 9, the hand-held device 1a points to the reference points R so as to detect the reference point direction information (a distance, a horizontal angle direction, and an inclination angle direction) by the G-sensor 21, the digital compass 22, and the ranging device 23 related to the hand-held device 1a relative to the reference point R so as to recalculate a new position coordinate of the hand-held device 1a.

Step S102a: calculate a new position coordinate of the hand-held device 1a, using the reference point direction information.

The computing module 30 calculates a new position coordinate (the position coordinate of the position P2) based on the direction information detected by the G-sensor 21, the digital compass 22, and the ranging device 23. Next, referring to FIG. 9, an explanation will be made of how a new position coordinate of the hand-held device 1a is calculated through the reference point direction. For convenience, please refer to FIG. 9A, FIG. 9B, and FIG. 9C of the accompanying drawings. A point to note is that FIG. 9C is a projection plan view of FIG. 9, wherein the coordinates of P1' and P2' in FIG. 9C lack the vertical heights (meaning the Y-coordinate is 0).

As shown in FIGS. 9A and 9C, it is assumed that the ranging device 23 detects the distance between the hand-held device 1a of the position P1 and the reference point R as $L_R$, and detects the distance between the hand-held device 1a at the position P2 and the reference point R as $L_B$; the digital compass 22 detects the direction information and calculates the horizontal angle as $\theta$; the G-sensor 21 detects the gravity components between the hand-held device 1a at the position P1 and the reference point R, further calculating an inclination angle as $\theta_R$, and the G-sensor 21 detects the gravity components between the hand-held device 1a at the position P2 and the reference point R, further calculating an inclination angle as $\theta_B$. As shown in FIG. 9C, the distance between the hand-held device 1a at the position P1' and the reference point R is $L_R' = L_R \times \cos\theta_R$; the distance between the hand-held device 1a at the position P2' and the reference point R is $L_B' = L_B \times \cos\theta_B$; the distance between the reference points R and F is $L_R' \times 1/\cos\theta$; the distance between the P2 and the point F is $L_B' - L_R' \times 1/\cos\theta$; the distance between points F and G is $(L_B' - L_R' \times 1/\cos\theta) \times \sin\theta$; the distance between P2' and the point G is $(L_B' - L_R' \times 1/\cos\theta) \times \cos\theta$.

Based on the data described as above, as shown in 9C, the coordinate of the hand-held device 1a at the position P2 is (0, 0, $L_R'$), wherein the X-coordinate value can be indicated by the distance between P1' and the reference point F, in addition to the distance between the points F and G, so the X-coordinate can be indicated as $L_R' \times \tan\theta + (L_B' - L_R' \times 1/\cos\theta) \times \sin\theta$.

The Z-coordinate value can be indicated by the distance between the hand-held device 1 at the position P1 and the reference point R, in addition to the distance between point G and P2'. Z-coordinate can be indicated as $L_B'\times\cos\theta L_R'+(L_B'-L_R'\times1/\cos\theta)\times\cos\theta$, or $L_B'\times\cos\theta$ with the equation simplified. Thus, the position coordinate of the hand-held device 1a at the position P2 can be indicated as $(L_R'\times\tan\theta+(L_B'-L_R'\times\cos\theta)\times\sin\theta, 0, L_R'+(L_B'-L_R'1/\cos\theta)\times\sin\theta)$. Then, calculate the Y-coordinate for finding the position coordinate of the hand-held device 1 at the position P2, $(L_A'\times\tan\theta+(L_B'-L_A'\times1/\cos\theta)\times\cos\theta, L_B\times\sin\theta_B', L_A'+(L_B'-L_A'\times1/\cos\theta)\times\cos\theta)$. A point to note is that the Z-coordinate can be indicated directly by $L_B$: $L_B'\times\cos\theta=L_B\times\cos\theta_B'\times\cos\theta$, so that the position coordinate of P2' can be indicated as $(L_R'\times\tan\theta+(L_B'-L_R'\times\cos\theta)\times\sin\theta, 0, L_B'\times\cos\theta_B'\times\cos\theta)$. The position coordinate of P2 is indicated as $$\left(L_R'\times\tan\theta+\left(L_B'-L_R'\times\frac{1}{\cos\theta}\right)\times\cos\theta, L_B\times\sin\theta_B', L_B'\times\cos\theta\right).$$

According to the aforesaid method, whenever the position is changed, a user 80 is only required to point to the reference point R again with a hand-held device 1a, using a G-sensor 21, a digital compass 22, and a ranging device 23 to detect the reference direction information thereof. By the aforesaid method, the position coordinate related to the hand-held device 1a at the new position can be calculated.

Step S103a: calculate a new location information related to the position of the hand-held device 1a relative to the electronic devices 101, 102, 103, 104, 110, using the new position coordinate.

After determining the position P2 of the hand-held device 1, the computing module 30 calculates the new location information related to the position of the hand-held device 1a relative to the electronic devices 101, 102, 103, 110 anew.

Step S104a: store the new location information in the location database 10.

The new location information calculated after position calibration is stored in the location database 10; meanwhile, the position calibration step S10 is finished, and it is necessary to go back to step S5.

After the position calibration step S10 is finished, the comparing module 40 of the hand-held device 1a distinguishes the pointed-to electronic device when the hand-held device 1a is present at the position P2 and confirms the pointed-to electronic device in steps S5-S7 before performing the subsequent corresponding operation. The aforesaid steps are the same as steps S4-S9 and thus are not described repeatedly. A point to note is that the greatest difference between the calibration methods of this embodiment and the first embodiment is that the hand-held device 1a, having the design with a ranging device 23, enables the user 80 at the position of the hand-held device 1a to complete the calibration by simply pointing to the reference point R with the hand-held device 1a.

A point to note is that the method for controlling electronic devices of the present disclosure is not limited by the step sequence disclosed therein; instead, changes can be made to the step sequence disclosed in the present disclosure, provided that the objectives of the present disclosure are achieved.

In conclusion, the features of the present disclosure are completely different from those of the prior art in terms of objectives, means, and effects. However, it should be noted that the above embodiments are illustrative of the principle and effect of the present disclosure only and should not be interpreted as restrictive of the scope of the present disclosure. Hence, persons skilled in the art can make modifications and changes to the aforesaid embodiments without violating the technical principle and spirit of the present disclosure. Accordingly, the extent of legal protection for the rights claimable toward the present disclosure should be defined by the appended claims.

What is claimed is:

1. A hand-held device for communicating with one or more electronic devices via a communicating platform such that, when the hand-held device points to one of the electronic devices in a pre-defined coordinate system, the hand-held device can control the pointed-to electronic device, the hand-held device comprising:

one or more orientation devices for detecting a direction information related to the pointed- to electronic device relative to the hand-held device;

a location database for storing a position coordinate of the electronic devices relative to one or more reference points in the pre-defined coordinate system, a position coordinate of the hand-held device relative to the one or more reference points in the pre-defined coordinate system, and a location information related to a position of the electronic devices relative to the hand-held device in the pre-defined coordinate system, wherein the one or more reference points comprise a first reference point in a vertical plane straight in front of the user and two other reference points in the vertical plane such that the other two reference points are diagonally opposite to each other, and wherein the position coordinate of the hand-held device is determined by detecting a plurality of reference point direction information related to the position of the hand-held device relative to the reference points, wherein the plurality of reference point direction information comprises horizontal angle information relative to each of the two diagonally opposite reference points, inclination angle information relative to each of the two diagonally opposite reference points and a distance between the two diagonally opposite reference points;

a computing module electrically connected to the orientation devices for calculating a pointed-to location information related to a position of the pointed-to electronic device relative to the hand-held device based on the direction information;

a comparing module electrically connected to the computing module for comparing the pointed-to location information with the location information stored in the location database to distinguish the pointed-to electronic device;

a control unit electrically connected to the comparing module for sending a control command to control the pointed-to electronic device; and a transmitting module electrically connected to the control unit for sending the control command to the pointed-to electronic device via the communicating platform.

2. The hand-held device of claim 1, wherein when the pointed-to location information does not match the location information stored in the location database, a new position coordinate of the hand-held device relative to the reference points is determined.

3. The hand-held device of claim 2, wherein the computing module, calculates a new location information related to the position of the electronic devices relative to the hand-held device based on the new position coordinate of the hand-held device, and stores the new location information in the location database.

4. The hand-held device of claim 3, wherein the at least one orientation devices are a G-sensor and a digital compass.

5. The hand-held device of claim 3, wherein the communication platform is a network conforming to the Digital Living Network Alliance (DLNA) standard.

6. The hand-held device of claim 3, wherein the communicating platform is the Internet.

7. A hand-held device for communicating with one or more electronic devices via a communicating platform such that, when the hand-held device points to one of the electronic devices in a pre-defined coordinate system, the hand-held device can control the pointed-to electronic device, the hand-held device comprising:
   one or more orientation devices for detecting a direction information related to the pointed- to electronic device relative to the hand-held device;
   a location database for storing a position coordinate of the electronic devices relative to one or more reference points in the pre-defined coordinate system, a position coordinate of the hand-held device relative to the one or more reference points in the pre-defined coordinate system, and a location information related to a position of the electronic devices relative to the hand-held device in the pre-defined coordinate system,
   wherein the one or more reference points is a single reference point and the single reference point is the coordinate origin of the pre-defined coordinate system, and
   wherein the position coordinate of the hand-held device is determined by detecting a reference point direction information related to the position of the hand-held device relative to the single reference point, wherein the reference point direction information comprises a horizontal angle information, an inclination angle information and a distance information of the hand-held device relative to the single reference point;
   a computing module electrically connected to the orientation devices for calculating a pointed-to location information related to a position of the pointed-to electronic device relative to the hand-held device based on the direction information;
   a comparing module electrically connected to the computing module for comparing the pointed-to location information with the location information stored in the location database to distinguish the pointed-to electronic device;
   a control unit electrically connected to the comparing module for sending a control command to control the pointed-to electronic device; and
   a transmitting module electrically connected to the control unit for sending the control command to the pointed-to electronic device via the communicating platform.

8. The hand-held device of claim 7, wherein when the pointed-to location information does not match the location information stored in the location database, the computing module calculates a new position coordinate of the hand-held device relative to the single reference point based on detecting a new reference point direction information; calculates a new location information related to the position of the electronic devices relative to the hand-held device based on the new position coordinate; and stores the new location information in the location database.

9. The hand-held device of claim 8, wherein at least one orientation device comprises a G-sensor, a digital compass, and a ranging device.

10. The hand-held device of claim 9, wherein the communication platform is a network conforming to the Digital Living Network Alliance (DLNA) standard.

11. The hand-held device of claim 9, wherein the communicating platform is the Internet.

12. A method for controlling electronic devices, by allowing a hand-held device to communicate with one or more electronic devices via a communicating platform in a pre-defined coordinate system such that, when the hand-held device points to one of the one or more electronic devices, the hand-held device can control the pointed-to electronic device, the method comprising the steps of:
   creating the pre-defined coordinate system in a space accommodating the electronic devices;
   storing in a location database, a position coordinate of the electronic devices relative to one or more reference points within the pre-defined coordinate system, a position coordinate of and the hand-held device relative to the one or more reference points within the pre-defined coordinate system and a location information related to a position of the electronic devices relative to the hand-held device within the pre-defined coordinate system,
   wherein the one or more reference points comprise a first reference point in a vertical plane straight in front of the user and two other reference points in the vertical plane such that the other two reference points are diagonally opposite to each other;
   loading the location database into the hand-held device;
   requesting whether calibration of the location information is necessary;
   detecting, by one or more orientation devices, a direction information related to the pointed-to electronic device relative to the hand-held device;
   calculating a pointed-to location information related to a position of the pointed-to electronic device relative to the hand-held device based on the direction information;
   comparing the pointed-to location information with the location information in the location database to distinguish the pointed-to electronic device;
   detecting one or more reference point direction information related to the hand-held device relative to one or more reference points, wherein the one or more reference points is a vertical point in front of a user or is the coordinate origin of the pre-defined coordinate system;
   starting a control unit for sending a control command; and
   sending the control command to the pointed-to electronic device via the communicating platform to control the pointed-to electronic device,
   wherein when the pointed-to location information does not match the location information stored in the location database, the location information related to a position of the electronic devices relative to the hand-held device is calibrated in the steps of:
   detecting a plurality of reference point direction information related to the position of the hand-held device relative to the plurality of reference points, wherein the plurality of reference point direction information comprises horizontal angle information relative to each of the two diagonally opposite reference points, inclination angle information relative to each of the two diagonally opposite reference points and a distance between the two diagonally opposite reference points;
   calculating a new position coordinate of the hand-held device based on the plurality of reference point direction information;

calculating a new location information related to a position of the electronic devices relative to the hand-held device based on the new position coordinate; and storing the new location information in the location database.

13. The method for controlling electronic devices of claim 12, wherein the location database is loaded into the hand-held device via the communication platform.

14. The method for controlling electronic devices of claim 12, wherein the communication platform is a network conforming to the Digital Living Network Alliance (DLNA) standard.

15. The method for controlling electronic devices of claim 12, wherein the communicating platform is the Internet.

16. A method for controlling electronic devices, by allowing a hand-held device to communicate with one or more electronic devices via a communicating platform in a pre-defined coordinate system such that, when the hand-held device points to one of the one or more electronic devices, the hand-held device can control the pointed-to electronic device, the method comprising the steps of:

creating the pre-defined coordinate system in a space accommodating the electronic devices;

storing in a location database, a position coordinate of the electronic devices relative to one or more reference points within the pre-defined coordinate system, a position coordinate of and the hand-held device relative to the one or more reference points within the pre-defined coordinate system and a location information related to a position of the electronic devices relative to the hand-held device within the pre-defined coordinate system, wherein the one or more reference points comprises a single reference point and the single reference point is the coordinate origin of the pre-defined coordinate system, and wherein the position coordinate of the hand-held device is determined by detecting reference point direction information related to the position of the hand-held device relative to the single reference point, wherein the reference point direction information comprises a horizontal angle information, an inclination angle information and a distance information of the hand-held device relative to the single reference point;

loading the location database into the hand-held device;

requesting whether calibration of the location information is necessary;

detecting, by one or more orientation devices, a direction information related to the pointed-to electronic device relative to the hand-held device;

calculating a pointed-to location information related to a position of the pointed-to electronic device relative to the hand-held device based on the direction information;

comparing the pointed-to location information with the location information in the location database to distinguish the pointed-to electronic device;

starting a control unit for sending a control command; and sending the control command to the pointed-to electronic device via the communicating platform to control the pointed-to electronic device.

17. The method for controlling electronic devices of claim 16, wherein, when the pointed-to location information does not match the location information stored in the location database, the location information related to a position of the electronic devices relative to the hand-held device is calibrated in the steps of:

detecting, by the at least one orientation devices, a reference point direction information related to the position of the hand-held device relative to the single reference point, wherein the reference point direction information comprises horizontal angle information, inclination angle information and distance information of the hand-held device relative to the single reference point;

calculating a new position coordinate of the hand-held device based on the reference point direction information;

calculating a new location information related to a position of the electronic devices relative to the hand-held device based on the new position coordinate; and storing the new location information in the location database.

18. The method for controlling electronic devices of claim 16, wherein the location database is loaded into the hand-held device via the communication platform.

19. The method for controlling electronic devices of claim 16, wherein the communication platform is a network conforming to the Digital Living Network Alliance (DLNA) standard.

20. The method for controlling electronic devices of claim 16, wherein the communicating platform is the Internet.

* * * * *